(12) United States Patent
Fouda et al.

(10) Patent No.: US 10,767,470 B2
(45) Date of Patent: Sep. 8, 2020

(54) INSPECTION OF WELLBORE CONDUITS USING A DISTRIBUTED SENSOR SYSTEM

(71) Applicant: Halliburton Energy Services, Inc., Houston, TX (US)

(72) Inventors: Ahmed Elsayed Fouda, Houston, TX (US); Burkay Donderici, Houston, TX (US); Luis E. San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 206 days.

(21) Appl. No.: 15/745,059

(22) PCT Filed: Aug. 20, 2015

(86) PCT No.: PCT/US2015/046015
§ 371 (c)(1),
(2) Date: Jan. 15, 2018

(87) PCT Pub. No.: WO2017/030585
PCT Pub. Date: Feb. 23, 2017

(65) Prior Publication Data
US 2018/0209265 A1 Jul. 26, 2018

(51) Int. Cl.
*E21B 47/135* (2012.01)
*G01N 27/90* (2006.01)
(Continued)

(52) U.S. Cl.
CPC ............ *E21B 47/135* (2020.05); *E21B 47/00* (2013.01); *G01N 17/02* (2013.01); *G01N 27/82* (2013.01); *G01N 27/904* (2013.01); *E21B 47/017* (2020.05)

(58) Field of Classification Search
CPC ...... G01N 27/904; E21B 47/00; E21B 47/011; E21B 47/123
See application file for complete search history.

(56) References Cited

U.S. PATENT DOCUMENTS 3,443,211 A * 5/1969 Walters ............... E21B 47/0905
324/232
3,940,689 A * 2/1976 Johnson, Jr. .......... E21B 47/082
324/221
(Continued)

FOREIGN PATENT DOCUMENTS

| WO | 2010013047 | 2/2010 |
| WO | 2014105080 | 7/2014 |
| WO | 2014175785 | 10/2014 |

OTHER PUBLICATIONS

International Search Report and Written Opinion for Application No. PCT/US2015/046015 dated Apr. 26, 2016.
(Continued)

*Primary Examiner* — Blake E Michener
(74) *Attorney, Agent, or Firm* — Thomas Rooney; C. Tumey Law Group PLLC

(57) ABSTRACT

Methods and systems are included that relate to the detection and monitoring of defects in wellbore conduits using a distributed sensor system and a wireline transmitter. A method for inspection of wellbore conduits may comprise: running a wireline transmitter into a wellbore; generating an electromagnetic field using the wireline transmitter, wherein the electromagnetic field penetrates one or more conduits disposed in the wellbore, and wherein the electromagnetic field induces emission of at least one secondary electromagnetic field from the one or more conduits; generating at least one signal in response to the secondary electromagnetic field, wherein the at least one signal is generated using a distributed sensor system, and wherein the distributed sensor system comprises electromagnetic field sensors installed in the wellbore and distributed along the one or more conduits; and identifying a pipe electromagnetic or geometric property of the one or more conduits based on the at least one signal.

30 Claims, 14 Drawing Sheets

(51) Int. Cl.
*E21B 47/00* (2012.01)
*G01N 27/82* (2006.01)
*G01N 17/02* (2006.01)
*E21B 47/017* (2012.01)

(56) References Cited

U.S. PATENT DOCUMENTS

| | | | |
|---|---|---|---|
| 4,188,577 A * | 2/1980 | Mhatre | G01N 27/9093 |
| | | | 324/220 |
| 4,292,589 A | 9/1981 | Bonner | |
| 4,629,985 A * | 12/1986 | Papadimitriou | E21B 17/006 |
| | | | 324/227 |
| 4,839,593 A | 6/1989 | Spies | |
| 4,843,317 A * | 6/1989 | Dew | G01B 7/10 |
| | | | 324/221 |
| 4,855,676 A | 8/1989 | Cecco et al. | |
| 5,233,297 A | 8/1993 | Lara | |
| 5,446,382 A * | 8/1995 | Flora | G01N 27/902 |
| | | | 324/232 |
| 5,453,693 A | 9/1995 | Sinclair et al. | |
| 5,523,685 A | 6/1996 | Kasai et al. | |
| 5,623,203 A | 4/1997 | Hosohara et al. | |
| 5,670,878 A | 9/1997 | Katahara et al. | |
| 5,747,998 A | 5/1998 | Fowler et al. | |
| 6,291,992 B1 | 9/2001 | Van Andel et al. | |
| 6,924,640 B2 * | 8/2005 | Fickert | E21B 47/082 |
| | | | 324/220 |
| 7,030,617 B2 | 4/2006 | Conti | |
| 7,095,223 B2 * | 8/2006 | Yoo | E21B 47/0905 |
| | | | 324/221 |
| 7,107,154 B2 | 9/2006 | Ward | |
| 7,403,000 B2 * | 7/2008 | Barolak | E21B 47/082 |
| | | | 324/221 |
| 8,165,825 B2 | 4/2012 | Legendre et al. | |
| 8,390,280 B2 | 3/2013 | Badoux et al. | |
| 8,395,376 B2 | 3/2013 | Singer et al. | |
| 8,958,989 B2 | 2/2015 | Legendre et al. | |
| 9,091,785 B2 | 7/2015 | Donderici et al. | |
| 9,273,548 B2 * | 3/2016 | LeBlanc | E21B 47/06 |
| 9,310,338 B2 * | 4/2016 | Yarbro | E21B 47/082 |
| 9,513,398 B2 * | 12/2016 | Wilson | E21B 43/10 |
| 9,557,439 B2 | 1/2017 | Wilson et al. | |
| 9,562,877 B2 * | 2/2017 | Khalaj Amineh | E21B 47/00 |
| 9,745,845 B2 * | 8/2017 | San Martin | E21B 47/00 |
| 9,977,144 B2 * | 5/2018 | David | G01V 3/26 |
| 10,139,371 B2 * | 11/2018 | Khalaj Amineh | E21B 47/00 |
| 10,260,854 B2 * | 4/2019 | Zhang | G01V 3/18 |
| 10,324,218 B2 * | 6/2019 | Nichols | G01V 3/26 |
| 10,338,030 B2 * | 7/2019 | Bittar | E21B 47/082 |
| 10,338,265 B2 * | 7/2019 | San Martin | G01N 17/00 |
| 10,502,044 B2 * | 12/2019 | Fouda | E21B 47/10 |
| 2006/0164091 A1 * | 7/2006 | Nestleroth | G01N 27/902 |
| | | | 324/326 |
| 2006/0202685 A1 * | 9/2006 | Barolak | E21B 47/082 |
| | | | 324/221 |
| 2008/0042646 A1 | 2/2008 | Burkhardt et al. | |
| 2009/0195244 A1 * | 8/2009 | Mouget | G01V 3/28 |
| | | | 324/221 |
| 2013/0193953 A1 * | 8/2013 | Yarbro | E21B 47/082 |
| | | | 324/76.77 |
| 2014/0097848 A1 * | 4/2014 | LeBlanc | E21B 47/06 |
| | | | 324/338 |
| 2015/0308980 A1 * | 10/2015 | Bittar | E21B 47/082 |
| | | | 73/152.54 |
| 2015/0338541 A1 * | 11/2015 | Nichols | G01V 3/26 |
| | | | 324/338 |
| 2016/0061776 A1 * | 3/2016 | Aslanyan | E21B 47/01 |
| | | | 324/339 |
| 2016/0084982 A1 * | 3/2016 | Donderici | G01V 3/18 |
| | | | 340/854.6 |
| 2016/0168975 A1 * | 6/2016 | Donderici | E21B 47/0006 |
| | | | 324/238 |
| 2016/0245779 A1 * | 8/2016 | Khalaj Amineh | E21B 47/0905 |
| 2016/0266269 A1 | 9/2016 | Wilson et al. | |
| 2016/0370166 A1 * | 12/2016 | Yang | G01N 27/904 |
| 2017/0082770 A1 | 3/2017 | Mandviwala et al. | |
| 2017/0123096 A1 | 5/2017 | Wilson et al. | |
| 2018/0245456 A1 * | 8/2018 | Khalaj Amineh | E21B 47/0905 |
| 2019/0086321 A1 * | 3/2019 | Amineh | G01N 17/006 |

OTHER PUBLICATIONS

"Full-signature real-time corrosion detection of underground casing pipes" by Yin et al. dated Feb. 29, 2000.
"Real-time full signature corrosion detection of underground casing pipes" by Yin et al. dated Jun. 30, 1996.
EM Pipe Scanner brochure from Slumberger dated 2009.
Go Well Magnetic Thickness Detector spec sheet dated 2016.

* cited by examiner

INSPECTION OF WELLBORE CONDUITS USING A DISTRIBUTED SENSOR SYSTEM

BACKGROUND

Provided are systems and methods that relate to inspection of wellbore conduits and, more particularly to the detection and monitoring of defects in wellbore conduits using a distributed sensor system and a wireline transmitter.

A common problem associated with subterranean wells may be the corrosion of conduits and other downhole equipment in the wellbore. The expense of repairing and replacing the damaged equipment may be high. Conduits that may be susceptible to corrosion may include casing, production tubing, and other downhole equipment. Examples of common types of corrosion that may occur in a wellbore include, but are not limited to, the rusting of metal, the dissolution of a metal in an acidic solution, and patina development on the surface of a metal.

Early detection of corrosion in conduits and other downhole equipment may be important to ensure the integrity and safety of the well. Techniques that have been deployed for downhole corrosion detection may involve running corrosion monitoring logging tools in the production tubing. Different types of corrosion monitoring logging tools may include mechanical calipers, ultrasonic acoustic tools, cameras, electromagnetic flux leakage, and electromagnetic induction tools. However, the ability of these tools to detect corrosion in outer casing beyond that which the logging tool is run may be limited. Electromagnetic induction tools that include at least one transmitting coil and at least one receiving coil may be able to detect corrosion in the outer casing. The transmitting coil may induce eddy currents inside the casings, including the inner and outer casing, and the receiving coil may record secondary fields generated from the casings. Those secondary fields bear information about the electrical properties and metal content of the casings and may be inverted for any corrosion loss in the metal content of the casings. Electromagnetic induction tools may be frequency domain tools that operate at discrete set of frequencies (e.g., higher frequencies to inspect inner casings) and lower frequencies to inspect outer conduits). Alternatively, the electromagnetic induction tools may operate in the time domain by transmitting transient pulses and measuring the decay response versus time (e.g., earlier time may correspond to inner casing and later time may correspond to outer casing). Two-dimensional (axial and azimuthal) thickness image of the inner casing may be possible by loading the tool with multiple sensing pads that may be pressed again the inner wall of the production tubing. However, while these techniques may be used for corrosion monitoring, there may be drawbacks. For instance, most of these techniques may use a wireline truck and a crew and may also require production to be stopped during inspection operations. Since inspection may be performed multiple times during the life of a well, each wireline inspection operation may result in signification costs associated with it.

BRIEF DESCRIPTION OF THE DRAWINGS

These drawings illustrate certain aspects of some examples of the present invention, and should not be used to limit or define the invention.

DETAILED DESCRIPTION

Figure 1:
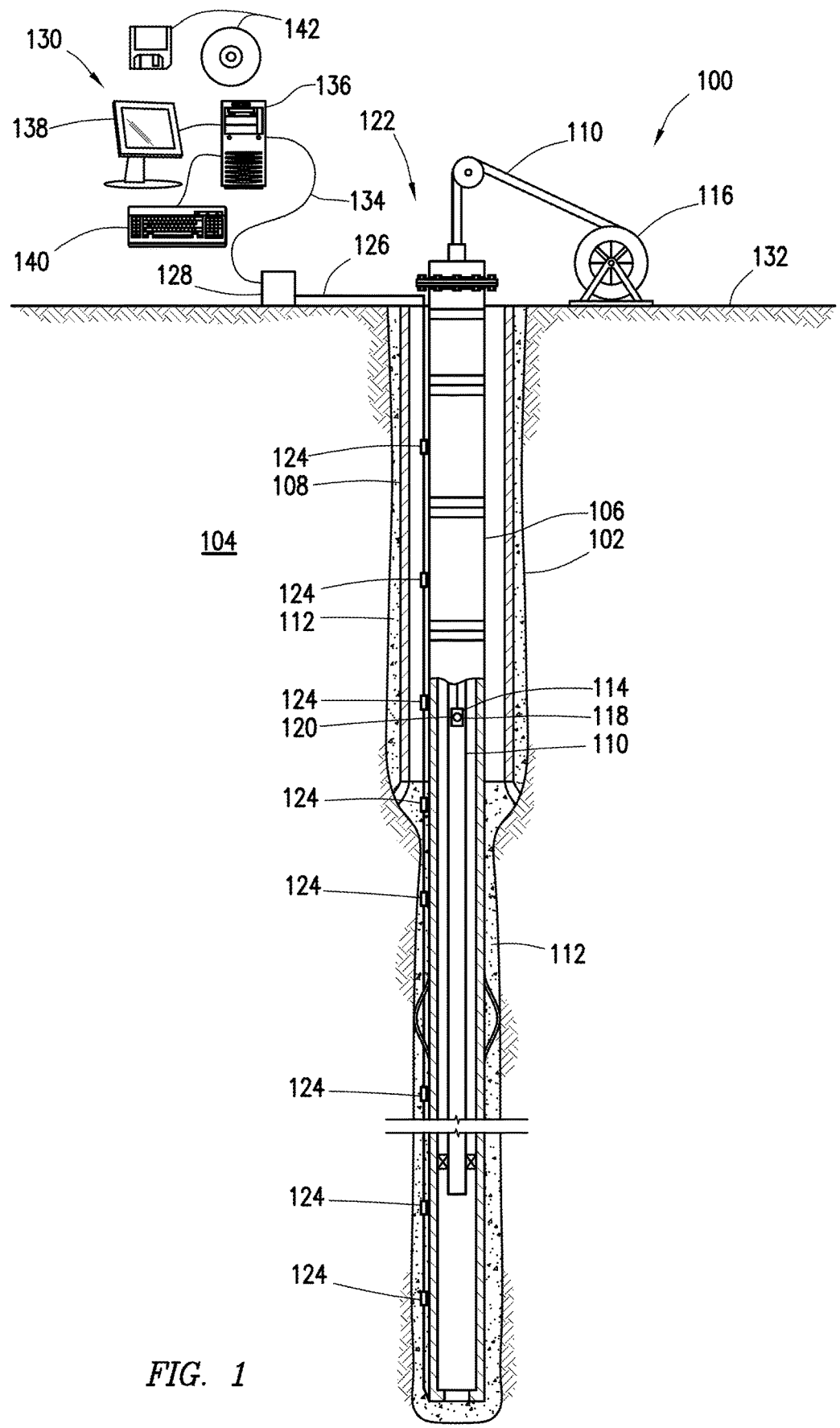
FIG. 1 is a schematic diagram of an example system for inspection of wellbore conduits using a distributed sensor system.

Provided are systems and methods that relate to inspection of wellbore conduits and, more particularly to the detection and monitoring of defects in wellbore conduits using a distributed sensor system and a wireline transmitter. The distributed sensor system may include sensors distributed on an optical fiber coupled to a casing installed in a wellbore. Measurements may be taken by running a wireline transmitter comprising at least one transmitting coil into the wellbore. A baseline measurement may be taken, for example, right after well completion, by running the wireline transmitter inside the production tubing in the wellbore and recording fields transmitted through one or more conduits installed in the wellbore using the sensor system. Time-lapse measurements may then be processed to determine pipe electromagnetic and/or geometric property change of the conduits, which may then be used to detect and monitor effects in the conduits. By way of example, the time-lapse measurements may be processed to determine pipe electromagnetic or geometric property changes, which may be indicative of pipe defects, such as corrosion, bucking, bending, pits, holes, cracks, or other defects in the one more conduits. Multiple frequencies may be used to scan different conduits, wherein higher frequencies may be used for inner conduits and lower frequencies may be used for outer conduits. The systems and methods may also provide two-dimensional (e.g., axial and azimuthal) monitoring. Composition techniques may be used to account for any deviation in the transmitter or sensor responses.

There may be several potential advantages to the systems and methods disclosed herein, only some of which may be alluded to herein. One of the many potential advantages of the methods and systems may be that characteristics of the conduits (e.g., corrosion) may be monitored using permanently installed sensors, normally used for reservoir monitoring, and a wireline transmitter, thus obviating the need for specialized corrosion logging tools. Another advantage of the methods and systems may be the ease of interpretation of the transmitted signal through the one or more conduits rather than interpretation of the reflected signal as in other electromagnetic corrosion logging tools. Yet another advantage may be two-dimensional corrosion monitoring of the outer casing without having to remove the production tubing, enabled by azimuthally distributed sensors, for example. Yet another advantage may be integration and operation of the distributed sensor system with other wellbore sensor systems (e.g., optical fiber based systems such as distributed acoustic sensing, distributed temperature sensing, and electromagnetic reservoir monitoring) as well as integration with intelligent well completion to monitor casing corrosion.

A method for inspection of wellbore conduits may be provided. The method may be used in conjunction with one or more of the methods and/or systems illustrated on FIGS. 1-12. The method may comprise running a wireline transmitter into a wellbore. The method may further comprise generating an electromagnetic field using the wireline transmitter. The electromagnetic field may penetrate one or more conduits disposed in the wellbore. The electromagnetic field may induce emission of at least one secondary electromagnetic field from the one or more conduits. The method may further comprise generating at least one signal in response to the secondary electromagnetic field. The at least one signal may be generated using a distributed sensor system. The distributed sensor system may comprise electromagnetic field sensors installed in the wellbore and distributed along the one or more conduits. The method may further comprise identifying a pipe electromagnetic or geometric property of the one or more conduits based on the at least one signal. The pipe electromagnetic or geometric property change may be due to a defect or corrosion. The one or more conduits may comprise a first casing and a second casing, wherein the first casing may be disposed within the second casing. The method may further comprise extracting measurements of the secondary electromagnetic field emitted from the second casing from the at least one signal. The extracting may comprise using measurements taken at a higher frequency to compensate for emissions from the first casing. The electromagnetic field sensors may be installed along the exterior of the first casing. The electromagnetic field sensors may comprise first electromagnetic field sensors and second electromagnetic field sensors, wherein the first electromagnetic field sensors may be installed along an exterior of the first casing, and wherein the second electromagnetic sensors may be installed along an exterior of the second casing. The electromagnetic field sensors may comprise first electromagnetic field sensors and second electromagnetic field sensors, wherein the first electromagnetic field sensors may be installed along an exterior of the first casing, and wherein the second electromagnetic sensors may be installed along an interior of the first casing. The at least one signal may be generated by using the difference between the readings of the first electromagnetic field sensor and the second electromagnetic field sensor. The distributed sensor system may comprise sensor strings that extend longitudinally along a particular conduit, the sensor strings may be distributed azimuthally about the particular conduit, wherein the particular conduit may be one of the one or more conduits. The distributed sensor system may comprise a sensor string that may be wound about a particular conduit in a spiral arrangement, wherein the particular conduit may be one of the one or more conduits. The distributed sensor system may comprise an optical fiber and at least a portion of the electromagnetic field sensors may be disposed along the optical fiber, wherein the optical fiber may extend along a particular conduit, wherein the electromagnetic field sensors each may comprise an electro-mechanical transducer coupled to the optical fiber and an elongated circumferential receiver, wherein the particular conduit may be one of the one or more conduits. The distributed sensor system may comprise a sensor string extending along a particular conduit, wherein the sensor string may comprise an optical fiber and the electromagnetic field sensors may be disposed along the optical fiber, wherein the optical fiber extends along a particular conduit, wherein the electromagnetic field sensors each may comprise an electro-mechanical transducer coupled to the optical fiber and an elongated circumferential receiver, wherein the particular conduit may be one of the one or more conduits. The distributed sensor system may comprise a first sensor string that extends along a particular conduit, wherein the first sensor string may comprise a first optical fiber and first electromagnetic field sensors may be disposed along the first optical fiber, wherein the first electromagnetic field sensors each may comprise a first electromechanical transducer coupled to the first optical fiber and a first elongated circumferential receiver. The distributed sensor system may further comprise a second sensor string that extends along the particular conduit, wherein the second sensor string may comprise a second optical fiber and second electromagnetic field sensors may be disposed along the second optical fiber, wherein the second electromagnetic field sensors each may comprise a second electromechanical transducer coupled to the second optical fiber and a second elongated circumferential receiver. The electromagnetic field sensors may comprise the first electromagnetic field sensors and the second electromagnetic field sensors. The particular conduit may be one of the one or more conduits. The electromagnetic field sensors may each comprise an electro-mechanical transducer coupled to a two-dimensional mesh receiver, wherein the two-dimensional mesh receiver may comprise at least one receiver selected from the group consisting of a solenoid receiver coil and a fingered coil. The wireline transmitter may comprise a solenoid coil. The wireline transmitter may comprise a tool body and arms that extend from the tool body, wherein the arms each may hold a transmitting coil in contact with an inner wall of a particular one of the one or more conduits. The method may further comprise processing absolute measurements of the at least one secondary field to identify a pipe electromagnetic or geometric property change in the one or more conduits. The method may further comprise obtaining two measurements made by the electromagnetic field sensors at different times, comparing a magnitude of a different between the two measurements to a threshold, and identifying a defect in the one or more conduits if the magnitude exceeds the threshold. The method may further comprise comparing actual measurements made by the electromagnetic field sensors to simulated measurements; and adjusting pipe electromagnetic and geometric properties until there is 5% error or less between the actual measurements and the simulated measurements.

A method for inspection of wellbore conduits may be provided. The method may be used in conjunction with one or more of the methods and/or systems illustrated on FIGS. 1-12. The conduit inspection system may comprise a wireline transmitter, wherein the wireline transmitter may comprise a tool body and a transmitter coil coupled to the body, wherein the transmitter coil may be configured to generate an electromagnetic field. The conduit inspection system may further comprise a distributed sensor system. The distributed sensor system may comprise electromagnetic field sensors installed in a wellbore and distributed along one or more conduits disposed in the wellbore, wherein electromagnetic fields sensors may be configured to generate at least one signal in response to at least one secondary magnetic field induced the one or more conduits by the electromagnetic field. The computer system may be configured to determine at least one characteristic of the one or more conduits based on the at least one signal. The one or more conduits may comprise a first casing and a second casing, wherein the first casing may be disposed within the second casing. The computer system may be configured to extract measurements of a secondary electromagnetic field emitted from the second casing from the at least one signal. The extraction may comprise using measurements taken at a higher frequency to compensate for emissions from the first casing. The electromagnetic field sensors may be installed along the exterior of the first casing. The electromagnetic field sensors may comprise first electromagnetic field sensors and second electromagnetic field sensors, wherein the first electromagnetic field sensors may be installed along an exterior of the first casing, and wherein the second electromagnetic sensors may be installed along an exterior of the second casing. The electromagnetic field sensors may comprise first electromagnetic field sensors and second electromagnetic field sensors, wherein the first electromagnetic field sensors may be installed along an exterior of the first casing, and wherein the second electromagnetic sensors may be installed along an interior of the first casing. The at least one signal may be generated by using the difference between the readings of the first electromagnetic field sensor and the second electromagnetic field sensor. The distributed sensor system may comprise sensor strings that extend longitudinally along a particular conduit, the sensor strings may be distributed azimuthally about the particular conduit, wherein the particular conduit may be one of the one or more conduits. The distributed sensor system may comprise a sensor string that may be wound about a particular conduit in a spiral arrangement, wherein the particular conduit may be one of the one or more conduits. The distributed sensor system may comprise an optical fiber and at least a portion of the electromagnetic field sensors disposed along the optical fiber, wherein the optical fiber may extend along a particular conduit, wherein the electromagnetic field sensors each may comprise an electro-mechanical transducer coupled to the optical fiber and an elongated circumferential receiver, wherein the particular conduit may be one of the one or more conduits. The distributed sensor system may comprise a sensor string extending along a particular conduit, wherein the sensor string may comprise an optical fiber and the electromagnetic field sensors may be disposed along the optical fiber, wherein the optical fiber may extend along a particular conduit, wherein the electromagnetic field sensors each may comprise an electro-mechanical transducer coupled to the optical fiber and an elongated circumferential receiver, wherein the particular conduit may be one of the one or more conduits. The distributed sensor system may comprise a first sensor string that extends along a particular conduit, wherein the first sensor string may comprise a first optical fiber and first electromagnetic field sensors disposed along the first optical fiber, wherein the first electromagnetic field sensors each may comprise a first electromechanical transducer coupled to the first optical fiber and a first elongated circumferential receiver. The distributed sensor system may further comprise a second sensor string that extends along the particular conduit, wherein the second sensor string may comprise a second optical fiber and second electromagnetic field sensors disposed along the second optical fiber, wherein the second electromagnetic field sensors each may comprise a second electromechanical transducer coupled to the second optical fiber and a second elongated circumferential receiver. The electromagnetic field sensors may comprise the first electromagnetic field sensors and the second electromagnetic field sensors. The particular conduit may be one of the one or more conduits. The electromagnetic field sensors may each comprise an electro-mechanical transducer coupled to a two-dimensional mesh receiver, wherein the two-dimensional mesh receiver may comprise at least one receiver selected from the group consisting of a solenoid receiver coil and a fingered coil. The transmitting coil may comprise a solenoid coil. The wireline transmitter may comprise arms that extend from the tool body, wherein the arms each may hold a transmitting coil in contact with an inner wall of a particular one of the one or more conduits. The computer system may be configured to process absolute measurements of the at least one secondary field to identify a pipe electromagnetic or geometric property change in the one or more conduits. The computer system may be configured to obtain two measurements made by the electromagnetic field sensors at different times, compare a magnitude of a different between the two measurements to a threshold, and identify a defect in the one or more conduits if the magnitude exceeds the threshold. The computer system may be configured to compare actual measurements made by the electromagnetic field sensors to simulated measurements; and adjust pipe electromagnetic and geometric properties until there is 5% error or less between the actual measurements and the simulated measurements.

FIG. 1 shows an example conduit inspection system 100 for use with a subterranean well. In the illustrated embodiment, the conduit inspection system 100 may be used to monitor one or more characteristics of conduits (e.g., first casing 106, second casing 108, inner tubing 110, etc.) over time. The conduits may comprise a suitable material, such as steel, chromium, or alloys. As illustrated, a wellbore 102 may extend through at least one subterranean formation 104. While the wellbore 102 is shown extending generally vertically into the subterranean formation 104, the principles described herein are also applicable to wellbores that extend at an angle through the subterranean formation 104, such as horizontal and slanted wellbores. For example, although FIG. 1 shows a vertical or low inclination angle well, high inclination angle or horizontal placement of the well and equipment is also possible. It should further be noted that while FIG. 1 generally depicts a land-based operation, those skilled in the art will readily recognize that the principles described herein are equally applicable to subsea operations that employ floating or sea-based platforms and rigs, without departing from the scope of the disclosure.

As illustrated on FIG. 1, one or more conduits, shown here as first casing 106, second casing 108, and inner tubing 110 may be disposed in the wellbore 102. First casing 106 may be in the form of an intermediate casing, a production casing, a liner, or other suitable conduit, as will be appreciated by those of ordinary skill in the art. Second casing 108 may be in the form of a surface casing, intermediate casing, or other suitable conduit, as will be appreciated by those of ordinary skill in the art. While not illustrated, additional conduits may also be installed in the wellbore 102 as desired for a particular application. In the illustrated embodiment, the first casing 106 and the second casing 108 may be cemented to the walls of the wellbore 102 by cement 112. Without limitation, one or more centralizers 114 (not shown) may be attached to either the first casing 106 and/or the second casing 108, for example, to centralize the respective conduit in the wellbore 102, as well as protect additional equipment (e.g., electromagnetic field sensors 124).

In the illustrated embodiment, the conduit inspection system 100 may comprise a wireline transmitter 114 for inducing eddy currents in the one or more conduits. Without limitation, hoist 116 may be used to run the wireline transmitter 114 into the wellbore 102. As illustrated, the wireline transmitter 114 may include a tool body 118 and a transmitter coil 120. Tool body 118 may be any suitable material, including without limitation titanium, stainless steel, alloys, plastic, combinations thereof, and the like. While FIG. 1 illustrates a single transmitter coil 120 being located in wireline transmitter 114, the present techniques encompass the use of two or more transmitter coils 120 on the wireline transmitter 114. The transmitter coil 120 may include any suitable electromagnetic transmitting coil including without limitation solenoid coils. While not illustrated on FIG. 1, a source may be used to energize the transmitter coil 120. As will be appreciated by those of ordinary skill in the art, energizing the transmitter coil 120, for example, by application of current to the transmitter coil 120, should cause the transmitter coil 120 to generate an electromagnetic field. In the illustrated embodiment, the electromagnetic field may induce eddy currents in the one or more conduits (e.g., first conduit 106, second conduit 108, and inner tubing 110), resulting in secondary fields generated from the one or more conduits that can be detected and processed to determine characteristics of the conduits. While not illustrated, the wireline transmitter 114 may also include one or more sensors for measurement of the secondary fields induced in the one more conduits.

Any of a variety different techniques may be used for operation of the wireline transmitter 114 for the generation of electromagnetic fields. For example, the wireline transmitter 114 may operate in the frequency domain or in the time domain. Moreover, the current in the transmitter coil 120 may be continuously adjusted as it scans so that lower current may be injected as the transmitter coil 120 approaches the electromagnetic field sensors 124. This approach with adjustment of the current may extend the dynamic range of the electromagnetic field sensors 124.

In the frequency domain, the wireline transmitter 114 may operate at a discrete set of frequencies, with higher frequencies used for the inner conduits (e.g., first conduit 106, inner tubing 110, etc.) and lower frequencies used for the outer conduits (e.g., second conduit 108). Without limitation, the higher frequencies may range from 20 Hertz to 200 Hertz or even higher. In one specific example, a frequency of 100 Hertz may be used as the higher frequency. These higher frequencies may penetrate through the first conduit 106 and the inner tubing 110, but by the time they reach the second conduit 108 the electromagnetic field may be too attenuated for inducing eddy currents. Without limitation, the lower frequencies may range from 0.1 Hz to 100 Hertz and, alternatively, from 1 Hertz to 50 Hertz. In one specific example, the lower frequency may be 50 Hertz. The lower frequencies may penetrate through the inner tubing 110 and the first conduit 106 and impinging on the second conduit 108 with stronger enough magnitude to create measurable scattered field that can be used to determine electromagnetic and/or geometric properties indicative of pipe defects. Alternatively, the wireline transmitter 114 may operate in the time domain. When operating in the time domain, the wireline transmitter 114 may transmit transient pulses wherein the resultant electromagnetic field measurements may be measured versus time.

For measurement of the electromagnetic field properties, the system 100 may further comprise a distributed sensor system 122, which may comprise electromagnetic field sensors 124, optical fiber 126, a signal generator/detector 128, and a computer system 130. The electromagnetic field sensors 124 may measure the secondary fields generated by the one or more conduits. Secondary fields contain information about the electromagnetic material properties of conduits (such as magnetic permeability, or conductivity) and geometry of conduits (such as inner and outer diameter, and thickness). In response to the secondary fields, the electromagnetic fields sensors 124 may generate at least one signal that can be subsequently processed to determine at least one characteristic of the one or more conduits. In the illustrated embodiment, a central processing unit 136 may process the signals received from the secondary fields at the electromagnetic field sensors 124 and solve for the electromagnetic properties and/or geometry of pipes in between the wireline transmitter 114 and the electromagnetic field sensors 124. The electromagnetic field sensors 124 may be distributed in the wellbore 102 along the one or more conduits and may be coupled (e.g., clamped) to the one or more conduits, for example, first casing 106, as illustrated in FIG. 1. Without limitation, the electromagnetic field sensors 124 may be distributed at a spacing that may vary based on a number of factors, including length of the monitoring zone and the required vertical resolution, for example. Depending on the subterranean formation 104, the electromagnetic field sensors 124 may have a spacing along the longitudinal axis of the one or more conduits, without limitation, of from about 5 feet to about 50 feet, or from about 10 feet to about 40 feet, or from about 15 feet to about 30 feet. In some embodiments, more than one of the electromagnetic field sensors 124 may be disposed at each longitudinal location, but a different axial locations, for example. In case high resolution inspection of a specific target zone (such as a reservoir) is required, a smaller spacing in the order of 6 inches to 5 feet may also be used.

The electromagnetic field sensors 124 may be any suitable sensor for generating signals in response to the secondary fields. Examples of suitable electromagnetic field sensors 124 may include a variety of different devices for sensing the electromagnetic field, including, without limitation, magnetic dipoles, electric dipoles, electrorestrictive transducers, magnetorestrictive transducers, solenoidally wound antennas (coils), toroidally wound antennas, axially spaced electrodes and azimuthally spaced electrodes. Selection of an appropriate electromagnetic field sensor 124 for eddy current pipe inspection may depend on a number of factors including, without limitation, the electromagnetic field pattern that it can generate.

One example of a suitable electromagnetic field sensor 124 may include one or more magnetorestrictive transducers that can translate the electromagnetic field measurements into an optical signal that can be detected at the surface 132. Magnetorestrictive transducers may include a magnetorestrictive material, such as cobalt, nickel, and iron metals and their alloys (e.g., Metglas and Terfenol-D® magnetorestrictive materials). By way of example, as the magnetorestrictive transducer may be exposed to an electromagnetic field, the magnetorestrictive transducer may experience a deformation, such as an expansion or contraction. By mechanically coupling (e.g., bonding) of the magnetorestrictive transducer to the optical fiber 126, this deformation should be transferred to the optical fiber 126 causing a corresponding strain, thus modulating light traveling through the optical fiber 126. This strain in the optical fiber 126 may be interrogated at the surface 132, for example, using known multiplexing circuitry. This may obviate the need for multiplexing circuitry downhole. The conduit inspection system 100 may be operated so that the strain may be linearly proportional to the applied field. Without limitation, the electromagnetic field sensors 124 may be packaged in electromagnetic compatible, high pressure, high temperature packages that may be connected to the optical fiber 126 and clamped to the one or more conduits, such as first casing 106. Examples of packing materials may include any of a variety of different materials, including plastic and metals, such as Iconol™ alloys or beryllium copper.

Another example of suitable electromagnetic field sensors 124 may include receiver coils for detecting the electromagnetic field in combination with an electro-mechanical transducer. Receiver coils may also be referred to as "sensor coils" or "pickup coils." The receiver coils may convert the electromagnetic field into a potential difference that may be applied to the electro-mechanical transducer, which in turn may experience a deformation, such as an expansion or contraction, upon exposure to the potential difference. Electro-mechanical transducers may include any suitable material that can convert the applied electrical energy into deformation, such as piezoelectric materials. By mechanically coupling (e.g., bonding) of the electro-mechanical transducer to the optical fiber 126, this deformation should be transferred to the optical fiber 126 causing a corresponding strain, thus modulating light traveling through the optical fiber 126. This strain in the optical fiber 126 may be interrogated at the surface 132, for example, using known multiplexing circuitry. This may obviate the need for multiplexing circuitry downhole. The conduit inspection system 100 may be operated so that the strain may be linearly proportional to the applied field.

Another example of suitable electromagnetic field sensors 124 may include electric dipole receivers for detecting the electromagnetic field in combination with an electro-mechanical transducer. Electric dipole receivers may also be referred to as "electric bipole receivers, "electric dipole antenna," and "electric bipole antenna." The poles in each electric dipole receiver may be separate axially or azimuthally. The poles may be electrically coupled to electro-mechanical transducers, which in turn may be mechanically coupled (e.g., bonded) to the optical fiber 126. As described above, the electro-mechanical transducers may induce strain in the optical fiber which may be interrogated at the surface.

After installation in the wellbore 102, the electromagnetic field sensors 124 may be calibrated, for example, to a modeled response of the one or more conduits without corrosion or other known defects. This may be known response (e.g., secondary fields) given the electromagnetic properties and size of the one or more conduits. In addition or in alternative to this technique for calibration, the wireline transmitter 114 may include two transmitter coils 120, wherein each of the transmitter coils 120 may be excited separately with the responses for each of the transmitter coils 120 from the one or more conduits recorded. The ratio between the two responses may be computed and then used in subsequent time-lapse measurements for determining properties of the one or more conduits. As this ratio may be free of receiver response, it may compensate for errors due to possible common changes in receiver responses with time.

Any suitable technique may be used for transmitting signals from the electromagnetic field sensors 124 to the surface, including transmission of optical signals, electrical signals, etc. As illustrated, an optical fiber 126 may be disposed in wellbore 102. For example, the optical fiber 126 may be placed along the one or more conduits. As illustrated, the optical fiber 126 may extend along an exterior portion of the first casing 106. It should be understood that the present embodiment is not intended to be limited to any configuration of the optical fiber 126, but instead is intended to be applicable to a wide variety of configurations and designs for the optical fiber 126, including, without limitation, fiberoptic cables, fiberoptic ribbon cables, etc. The optical fiber 126 may be coupled to the electromagnetic field sensors 124. The electromagnetic field sensors 124, for example, may measure the electromagnetic field and translate that into a phase shift of light going through the optical fiber 126. As previously described, the electromagnetic field sensors 124 may include magnetorestrictive transducers or electro-mechanical transducers that can induce a strain in the optical fiber 126. Alternatively, an electronic switching circuit (not shown) may be disposed downhole that may be used to multiplex signals from different electromagnetic field sensors 124 (e.g., receiver coils, electric dipole receivers, etc.) to a communication link, such as an electric cable or optical fiber 126, that delivers the signal to the surface 132.

The optical fiber 126 may be coupled to a signal generator/detector 128 at the surface 132 that can generate a signal to be transmitted downhole. By way of example, the optical fiber 126 may terminate at a surface interface with an optical port adapted for coupling fiber(s) in the optical fiber 126 to a light source and a detector in the signal generator/detector 128. The light source may transmit pulses of light along the optical fiber 126 to the electromagnetic field sensors 124. The electromagnetic field sensors 124, for example, may modify the light pulse to provide measurements of the electromagnetic field. The modifications may affect amplitude, phase, or frequency content of the light pulses, enabling the signal generator/detector 128 to responsively produce an electrical output signal indicative of the sensor measurements. Some systems may employ multiple fibers, in which case an additional light source and detector can be employed for each fiber, or the existing source and detector may be switched periodically between the fibers.

The signal generator/detector 128 may be coupled to a computer system 130 that may be coupled to the signal generator/detector 128 by a control line 134. The computer system 130 may include a central processing unit 136, a monitor 138, an input device 140 (e.g., keyboard, mouse, etc.) as well as computer media 142 (e.g., optical disks, magnetic disks) that can store code representative of the above-described methods. The computer system 130 may be adapted to receive signals from the signal generator/detector 128 representative of the electromagnetic field sensor 124 measurements. The computer system 130 may act as a data acquisition system and possibly a data processing system that analyzes the electromagnetic field sensor 124 measurements, for example, to derive one or more properties of the conduits and track them over time.

An example technique for inspection of wellbore conduits, such as first casing 106, second casing 108, and inner tubing 110 will be now be described. The method may comprise running a wireline transmitter 114 into the wellbore 102. The wireline transmitter 114 may generate an electromagnetic field while it is being run into the wellbore 102. As previously described, the wireline transmitter 114 may operate in the frequency domain or in the time domain. The electromagnetic field may penetrate one or more conduits disposed in the wellbore 102. In response to the electromagnetic field, secondary fields may be induced in the one more conduits. For example, a secondary field may be induced in the first conduit 106, a secondary field may be induced in the second conduit 108, and/or a secondary field may be induced in the inner tubing 110. The electromagnetic field sensors 124 may be used to measure electromagnetic field properties in the wellbore, including the secondary fields generated by the one or more conduits. In response to the secondary fields, the electromagnetic fields sensors may generate signals that can be transmitted to the surface 132.

To determine pipe electromagnetic and/or geometric property change of the one or more conduits, including pipe thickness or pipe defects, such as corrosion, buckling, bending, pits, holes, cracks, or other defects in the one more conduits, the signals transmitted to the surface 132 may be processed, for example, using computer system 130. For monitoring characteristics, time-lapse measurements may be taken. For example, the signals may be subtracted from a baseline measurement, which may be taken right after deployment of the one or more conduits. For example, the baseline measurement may be taken before any corrosion has occurred in the one or more conduits, such as first casing 106 or second casing 108. This differential signal may reflect any change in the pipe characteristics (e.g., pipe thickness) of the one or more conduits that may have occurred over time.

For operation in the frequency domain, the signals from the other conduits may need be taken into account. As previously described, multiple frequencies may be used to scan different conduits, wherein higher frequencies may be used for inner conduits (e.g., first casing 106) and lower frequencies may be used for outer conduits (e.g., second casing 108). When operating at higher frequencies, the signals may correspond mainly to the first casing 106 and the inner tubing 110, as the electromagnetic field was too attenuated by the inner conduits to induce eddy currents in the second casing 108. Accordingly, to extract the response of the first casing 106 when operating at higher frequencies, the inner tubing 110 may need to be compensated for. Without limitation, the inner tubing 110 may be monitored using another tool, including, direct contact tools such as ultrasonic, electromagnetic flux leakage, mechanical caliper, or electromagnetic corrosion detection tools. Any corrosion detected in the inner tubing 110 may be compensated in the differential measurement to yield the response of the first casing 106. When operating at lower frequencies, the signals may include secondary fields induced by the outer conduit (e.g., second casing 108), as well as the secondary fields from the inner conduits (e.g., first casing 106, inner tubing 110). Once corrosion in the inner conduits has been determined, for example, at the higher frequencies, it may be compensated for in the lower frequency signals to extract the response for the outer conduit, which in this example is the second casing 108. The same wireline transmitter 124 may be used to monitor both the inner and outer conduits or a wireline transmitter 124 with a longer coil may be used to provide deeper penetration for monitoring of the outer conduit.

Figure 2:
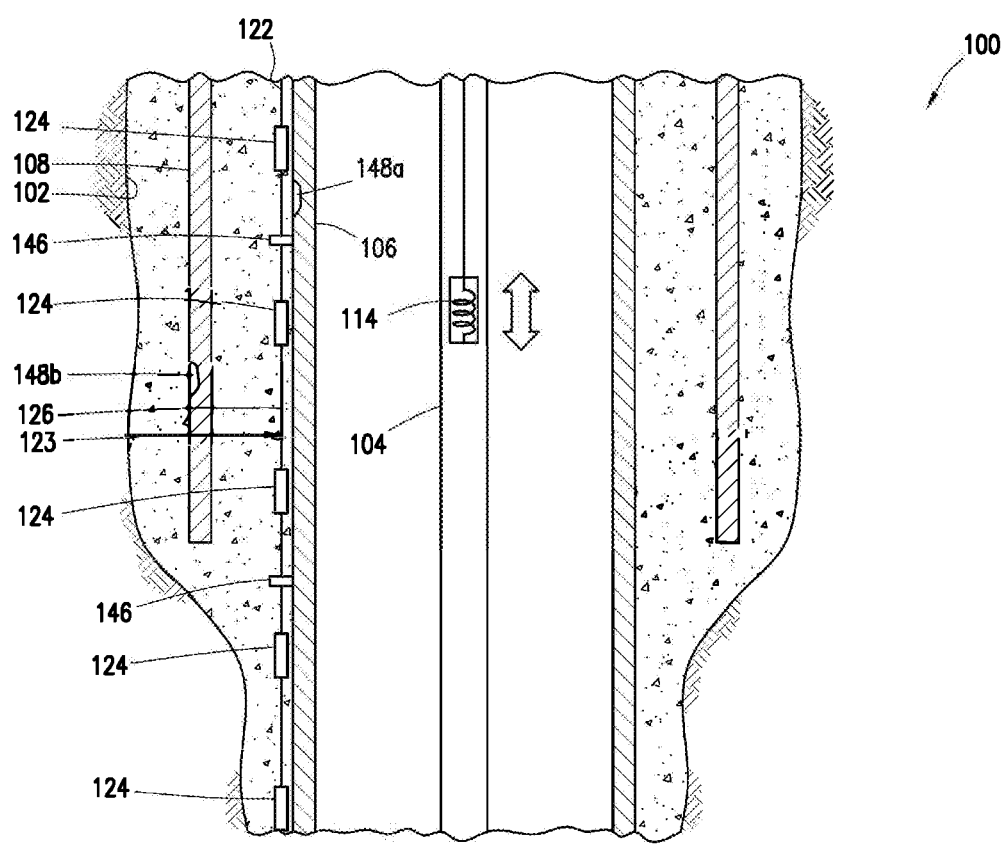
FIG. 2 is a schematic diagram showing a close-up view of the example system of FIG. 1.

Referring now to FIG. 2, a close-up view of a portion of the conduit inspection system 100 of FIG. 1 is illustrated in more detail. As illustrated, the first casing 106, second casing 108, and inner tubing 110 may be disposed in wellbore 102. The first casing 106 may be disposed inside the second casing 108 with the inner tubing 110 disposed inside the first casing 106. The conduit inspection system 100 may comprise a wireline transmitter 114, which may be run into the wellbore 102 inside the inner tubing 110, as illustrated in FIG. 2. The conduit inspection system 100 may further comprise a distributed sensor system 122 comprising a plurality of electromagnetic field sensors 124 disposed along the one or more conduits. As illustrated on FIG. 2, the electromagnetic field sensors 124 may be installed in the wellbore 102 along the inner casing, illustrated as first casing 106. The electromagnetic field sensors 124 are shown along the exterior of the first casing 106, but may be installed on the exterior or interior of the first casing 106, as desired for a particular application. The distributed sensor system 122 may further comprise optical fiber 124. As illustrated, the electromagnetic field sensors 124 may be disposed on the optical fiber 124. Any suitable technique may be used for installation of the sensor string 123 of the electromagnetic field sensors 124 and the optical fiber 126 along the first casing 106. As illustrated, the sensor string 123 of the electromagnetic field sensors 124 and the optical fiber 126 may be clamped to the first casing 106, for example, using clamping mechanism 146. As previously described, the conduit inspection system 100 may be used to determine at least one characteristics of the one or more conduits. For example, the conduit inspection system 100 may be used to identify one or more defects in the conduits, identified as first defect 148a in first casing 106 and second defect 148b in second casing 108.

While FIGS. 1 and 2 illustrate electromagnetic field sensors 124 distributed along only one of the conduits (e.g., first casing 106) installed in the wellbore 102, it should be understood that the electromagnetic field sensors 124 may be installed along one or more of the conduits in the wellbore 102. For example, the electromagnetic field sensors 124 may be installed along the first casing 106, the second casing 108, or the inner tubing 110 or any combination of the one or more conduits. By way of further example, the electromagnetic field sensors 124 may be installed along the interior or exterior of one or more of the conduits in the wellbore 102. While not illustrated, installation of electromagnetic field sensors 124 along the inner tubing 110 may be used to determine one or more characteristics of the inner tubing 110 without the need for additional tools. The electromagnetic field sensors 124 installed along the inner tubing 110 may also be used to determine characteristics of other conduits, such as the first casing 106 and the second casing 108, for example, by use of progressively lower frequencies. Additionally, the electromagnetic field sensors 124 along the inner tubing 110 may be used in combination with placement of electromagnetic field sensors 124 along one or more additional conduits in the wellbore 102. In addition, by coupling of electromagnetic field sensors 124 to an inner tubing 110 (e.g., production tubing) that has been pulled out of an existing wellbore 102, the present techniques may be extended to inspection of existing wells rather than new construction, in some examples.

Figure 3:
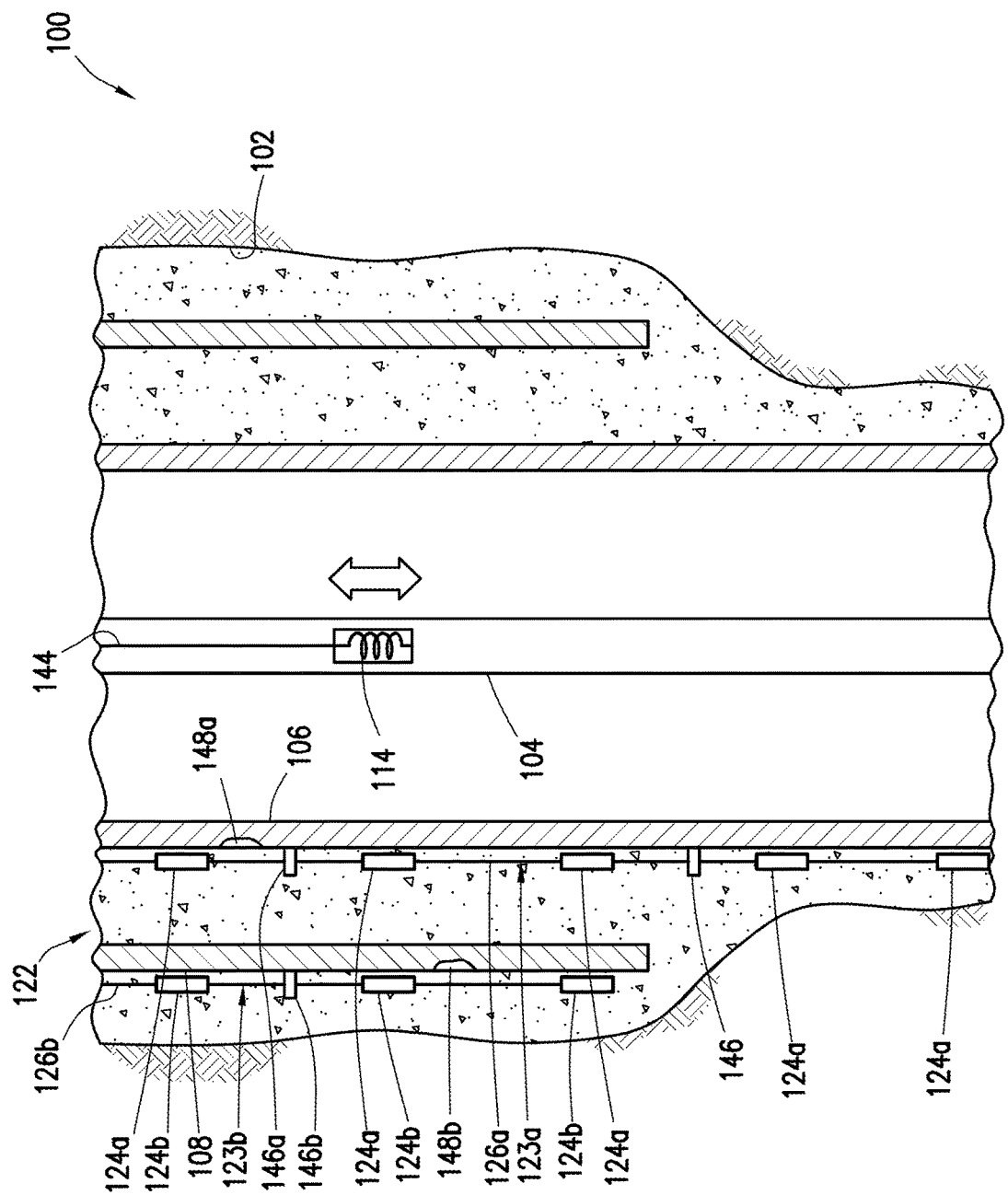
FIG. 3 is a schematic diagram of another example system for inspection of wellbore conduits using a distributed sensor system.

Referring now to FIG. 3, another example of a conduit inspection system 100 is shown in which the distributed sensor system 122 includes a first sensor string 123a and a second sensor string 123b. As illustrated, the first sensor string 123a may be disposed along the inner casing (e.g., first casing 106) and the second sensor string 123b may be disposed along the outer casing (e.g., second casing 108). While shown on the exterior of their corresponding conduits, it should be understood that the first sensor string 123a and the second sensor string 123b may be installed on the interior or exterior of the corresponding conduits as desired for a particular application. The first sensor string 123a and the second sensor string 123b may be coupled to the first casing 106 and the second casing 108, respectively, using any suitable mechanism, including clamping mechanisms 146a, 146b. As will be appreciated by those of ordinary skill in the art, the distributed sensor system 122 of FIG. 3 may also include a signal generator/detector 128 and computer system 130, examples of which are illustrated and described with respect to FIG. 1.

The first sensor sting 123a may comprise first electromagnetic field sensors 124a disposed on first optical fiber 126a. The second sensor string 123b may comprise second electromagnetic field sensors 124b disposed on the second optical fiber 126b. The first sensor string 123a may be used for inspection of the first casing 106, while the second sensor string 123b may be used for inspection of the second casing 108. In response to secondary fields generated by the one or more conduits, the first and second electromagnetic field sensors 124a, 124b may generate signals. The secondary fields may be induced by an electromagnetic field generated by the wireline transmitter 114. The signals generated by the first electromagnetic field sensors 124a may be processed to determine one or more characteristics of the first casing 106, for example, after compensation for response of the inner tubing 110. For example, the conduit inspection system 100 may be used to identify first defect 148a in first casing 106. The signals generated by the second electromagnetic field sensors 124b may be processed to determine one or more characteristics of the second casing 108 after compensation for response of the first casing and the inner tubing 110. For example, conduit pipe inspection system 100 may be used to identify second defect 148b in second casing 108. Because the second electromagnetic field sensors 124b may be disposed long the second casing 108, its signals may be more sensitive to characteristics of the second casing 108 and less sensitive to characteristics in the first casing 106 and the inner tubing 110, thus allowing for easier interpretation.

Figure 4:
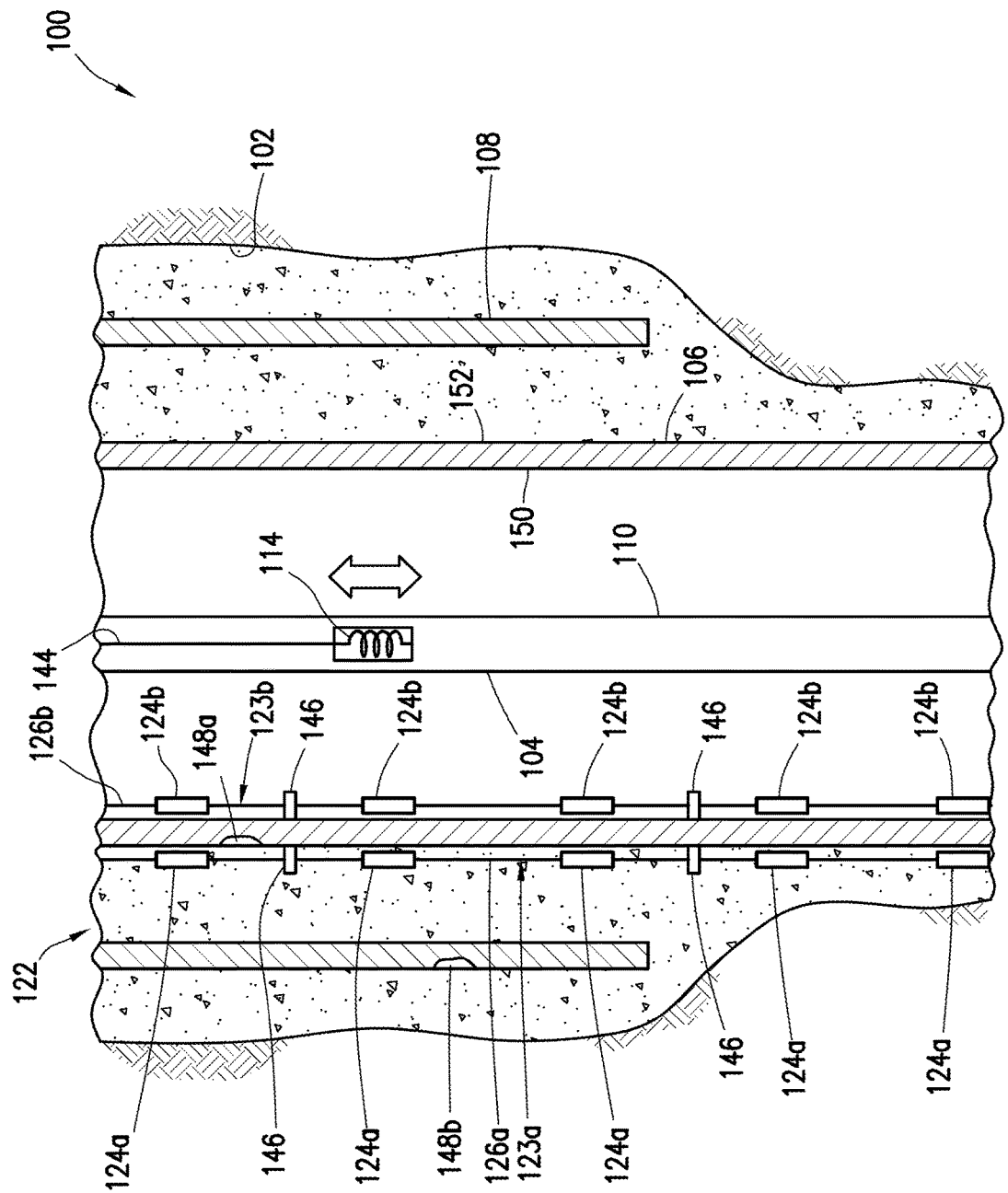
FIG. 4 is a schematic diagram of another example system for inspection of wellbore conduits using a distributed sensor system.

Referring now to FIG. 4, another example of a conduit inspection system 100 is shown in which the distributed sensor system 122 includes a first sensor string 123a and a second sensor string 123b. However, in contrast to the distributed sensor system 122 shown on FIG. 3, the distributed sensor system 122 of FIG. 4 may include the second sensor string 123b disposed along an interior of the first casing 106 instead of the exterior of the second casing 108. The first sensor string 123a and the second sensor string 123b may be coupled to the first casing 106 using any suitable mechanism, including clamping mechanism 146. As will be appreciated by those of ordinary skill in the art, the distributed sensor system 122 of FIG. 4 may also include a signal generator/detector 128 and computer system 130, examples of which are illustrated and described with respect to FIG. 1.

By coupling of the first and second electromagnetic field sensors 124a and 124b to both the interior and exterior of the first casing 106, signals generated by the second electromagnetic fields sensors 124a and 124b in response to secondary fields induced in the first casing 106 may be used to have an improved determination of attenuation through the first casing 106. Moreover, the signals may be used to distinguish characteristics of the inner wall 150 of the first casing 106 from characteristics from the outer wall 152 of the first casing 106. Multiple frequencies may be used to inspect the inner wall 150 and the outer wall 152, wherein higher frequencies may be used for inner wall 150 and lower frequencies for outer wall 152. While not illustrated, first sensor string 123a and second string 123b may be similarly installed along the exterior and interior of the second casing 108, respectively. Differential signals can be computed by subtracting measurement from one side of the first casing 106 from the other side. To perform the subtraction sensors corresponding to the same position may be used. Differential signals may then be processed to compute attenuation through the conduits or pipe electromagnetic or geometric properties through the process of inversion or any other method of interpretation.

Figure 5:
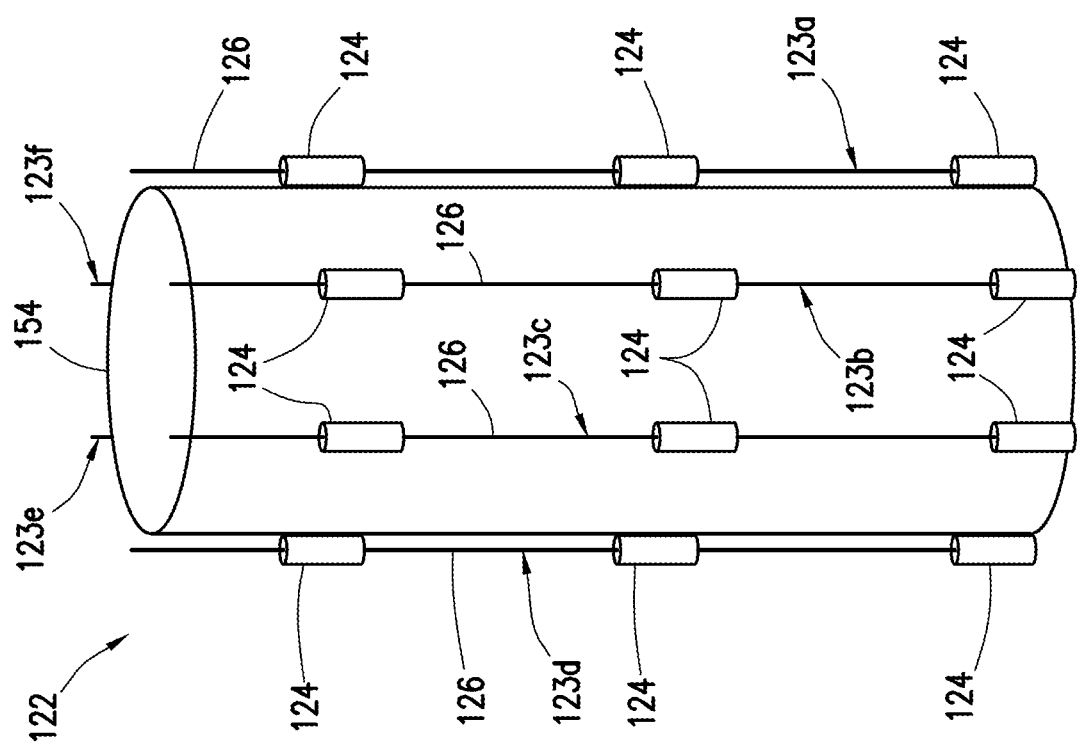
FIG. 5 is a schematic diagram of another example system for inspection of wellbore conduits using a distributed sensor system.
Figure 7:
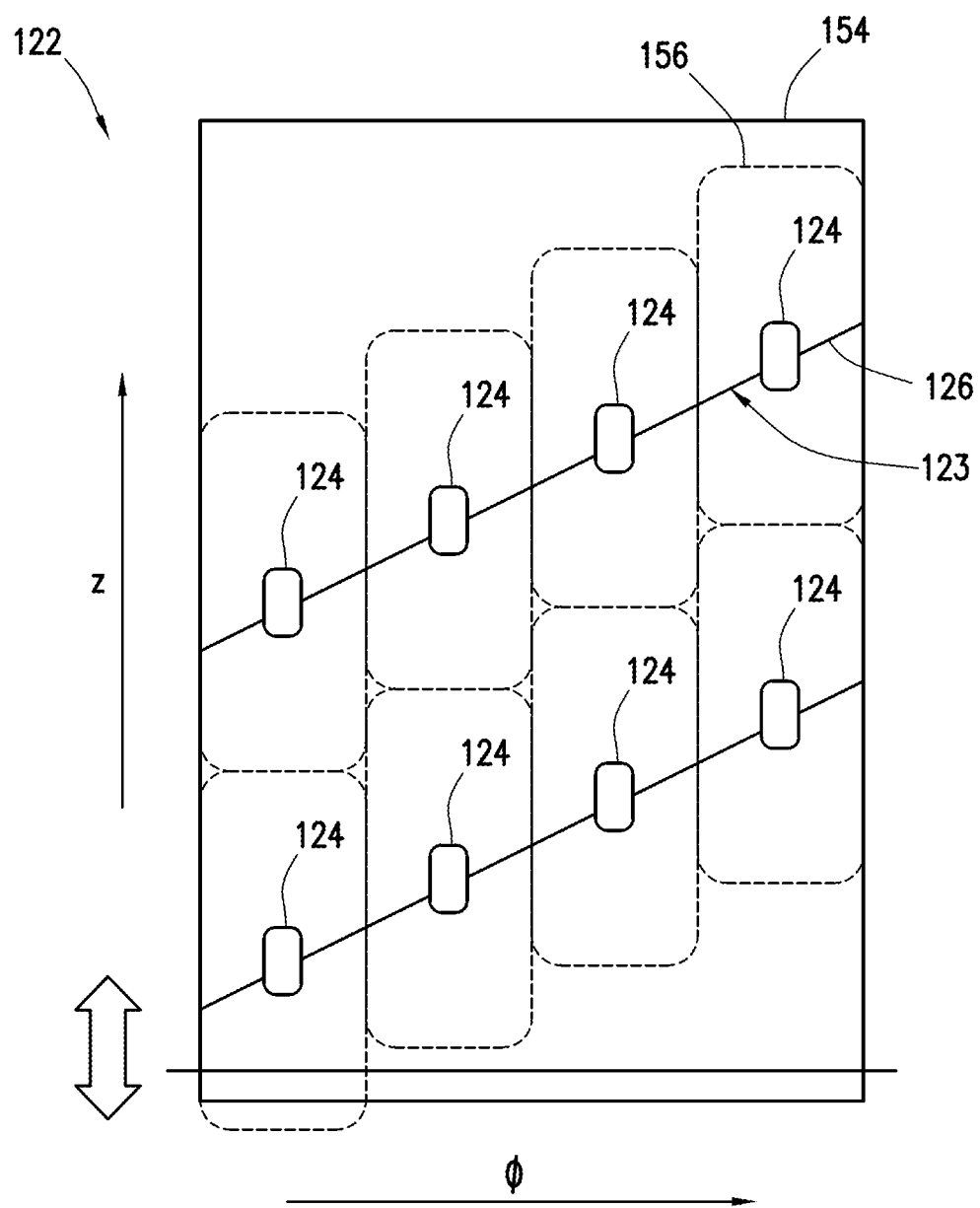
FIG. 7 is another view of the example system of FIG. 6.

FIG. 5 illustrates an alternative arrangement of a distributed sensor system 122 that may be used in the systems and methods disclosed herein. The distributed sensor system 122 shown on FIG. 5 may be used with the other components of the conduit inspection system 100 shown on FIG. 1 for monitoring one or more conduits in a wellbore 102. As illustrated in FIG. 5, the electromagnetic field sensors 124 may be distributed both azimuthally about the conduit 154 and longitudinally along the conduit 154, which may be any suitable wellbore conduit, including without limitation production casing, surface casing, a liner, production tubing, and the like. In the illustrated example, six sensor strings are distributed along the conduit 154, identified on FIG. 5 as sensor strings 123a, 123b, 123c, 123d, 123e, and 123f. Each of the sensor strings include electromagnetic field sensors 124 disposed on an optical fiber 126. As illustrated, the electromagnetic field sensors 124 are distributed both azimuthally about the conduit 154 and longitudinally along the conduit 154. The arrangement of FIG. 5 may provide for azimuthal monitoring sensitivity.

Figure 6:
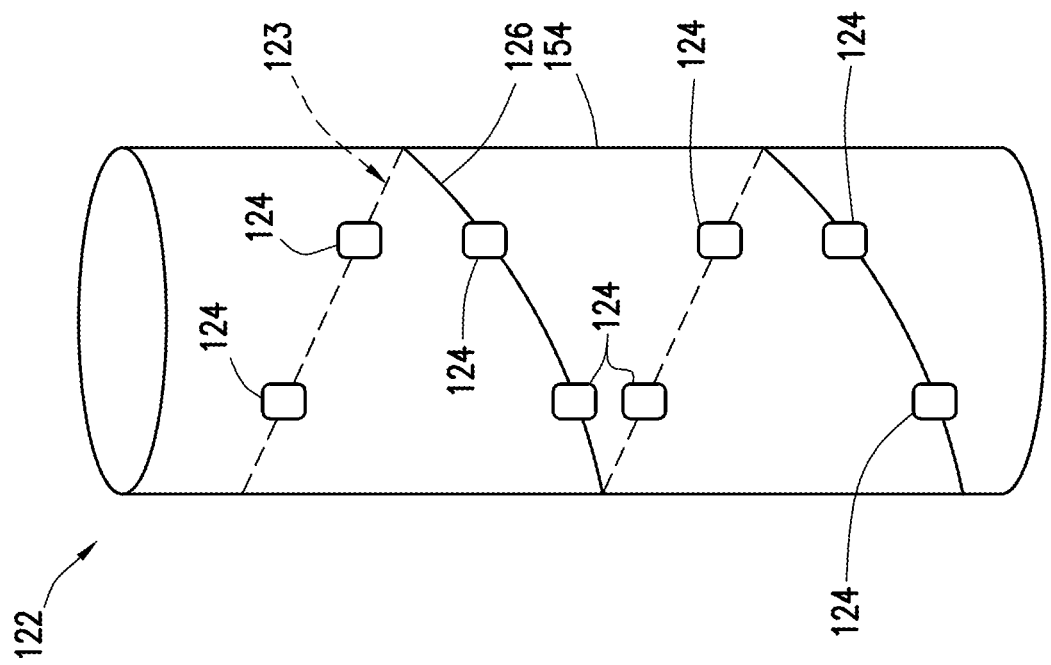
FIG. 6 is a schematic diagram of another example system for inspection of wellbore conduits using a distributed sensor system.

FIG. 6 illustrates another alternative arrangement of a distributed sensor system 122 that may be used in the systems and methods disclosed herein. The distributed sensor system 122 shown on FIG. 6 may be used with the other components of the conduit inspection system 100 shown on FIG. 1 for monitoring one or more conduits in a wellbore 102. As illustrated in FIG. 6, the sensor string 123 of the electromagnetic field sensors 124 and the optical fiber 126 may be wound about the conduit 154. By way of example, the sensor string 123 may be disposed about the conduit 154 in a spiral arrangement. On FIG. 6, the portion of the optical fiber 126 winding behind the conduit 154 and obstructed from view is shown by dashed lines. An unfolded view of the spiral arrangement of FIG. 6 is illustrated on FIG. 7. Each of the electromagnetic field sensors 124 in the spiral arrangement may be sensitive to different azimuthal and axial segments of the conduit 154, illustrated on FIG. 7 as segments 156.

Figure 8:
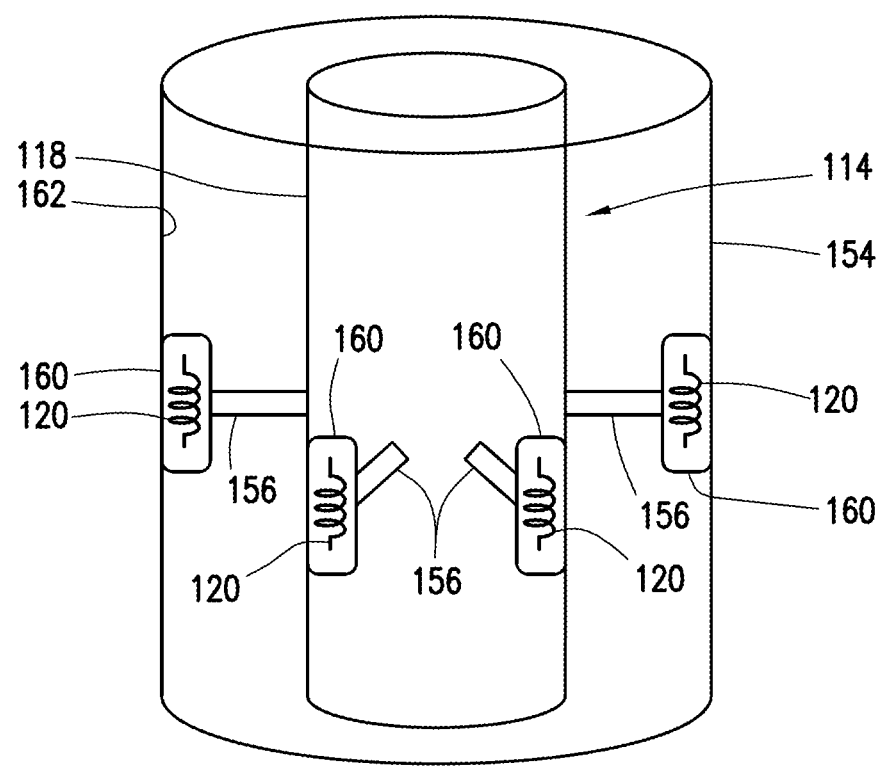
FIG. 8 is a schematic diagram of an example wireline transmitter.

FIG. 8 illustrates an example another technique that may be used to improve azimuthal sensitivity to a conduit inspection system 100, such as those described and illustrated herein. On FIG. 8, a wireline transmitter 114 is shown disposed inside a conduit 154. As illustrated, the wireline transmitter 114 may comprise a tool body 118. Tool body 118 may be any suitable material, including without limitation titanium, stainless steel, alloys, plastic, combinations thereof, and the like. The wireline transmitter 114 may further comprise transmitter coils 120 coupled to the tool body 118. The tool body 118 may further comprise arms 158 that extend from the tool body 118. As illustrated, the arms 158 may extend radially outward from the tool body 118. Any number of arms 158 may extend from the tool body 118. In the illustrated example, six arms 158 may extend from the tool body 118, wherein two of the arms 158 are obstructed from view. Each of the arms 158 may have a pad 160, which may be made from a suitable insulating material, disposed at a distal end thereof. Any suitable mechanism may be used for securing the pads 160 to the arms 158, including screws or other suitable fasteners. At least one transmitting coil 120 may be disposed in each pad 160. The transmitting coil 120 may be configured to be in contact with an inner wall 162 of the conduit 154 when the wireline transmitter 114 is run into the conduit 154. This arrangement may increase the spatial diversity and improve azimuthal sensitivity.

Figure 9:
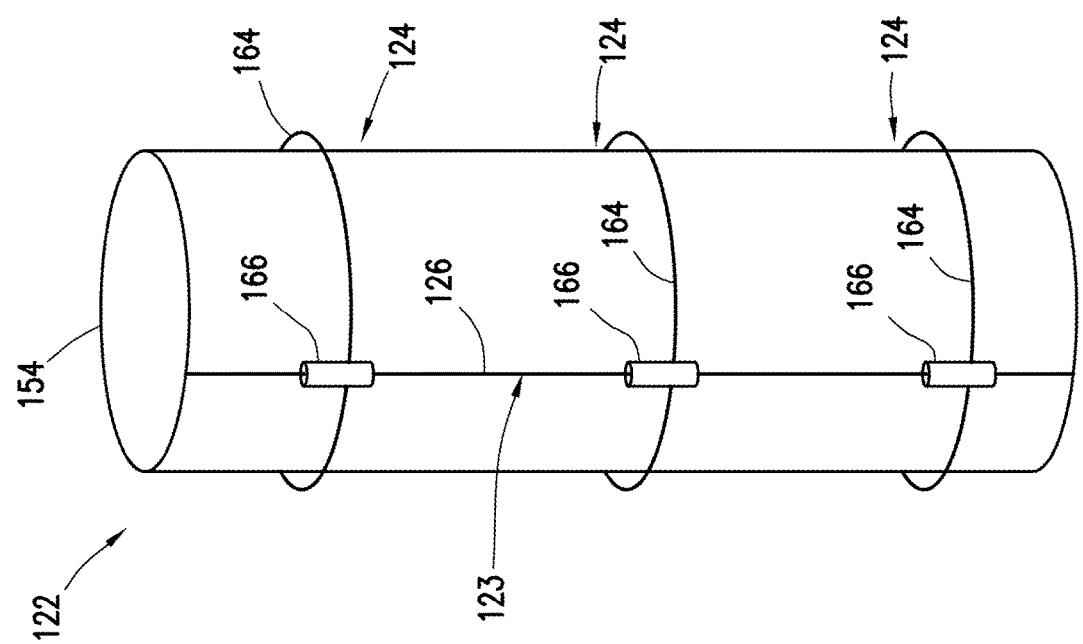
FIG. 9 is a schematic diagram of another example system for inspection of wellbore conduits using a distributed sensor system.

FIG. 9 illustrates another arrangement of a distributed sensor system 122 that may be used in the systems and methods disclosed herein. The distributed sensor system 122 shown on FIG. 9 may be used with the other components of the conduit inspection system 100 shown on FIG. 1 for monitoring one or more conduits in a wellbore 102. As illustrated, the distributed sensor system 122 may comprise a sensor string 123 coupled to and extending along the conduit 154. The distributed sensor system 122 may comprise an optical fiber 126 and electromagnetic field sensors 124 disposed along the optical fiber 126. As described above, the electromagnetic field sensors 124 may include any suitable electromagnetic field sensor. As illustrated, the electromagnetic field sensors 124 may each comprise a receiver 164 and an electro-mechanical transducer 166.

The receivers 164 may be in signal communication with the electro-mechanical transducer 166 and may sense the electromagnetic field data, including the secondary fields, and may convert the electromagnetic field data into a potential difference that may be applied to the electro-mechanical transducer 166. While the receivers 164 may comprise a variety of different receiver configurations, including receiver coils and electric dipole receivers, the receivers 164 are illustrated on FIG. 9 as elongated circumferential receivers. The receivers 164 may comprise a conductive material, such as metals, steel, or alloys. As illustrated, the receivers 164 may be elongated and may extend at least partially around the circumference of the conduit 154, for example, the receivers 164 may extend, without limitation, about 25%, about 50%, about 75%, about 90%, or more around the circumference of the conduit 154.

The electro-mechanical transducer 166 may experience a deformation, such as an expansion or contraction, upon exposure to the potential difference from the receiver 164. Electro-mechanical transducers may include any suitable material that can convert the applied electrical energy into deformation, such as piezoelectric materials. By mechanically coupling (e.g., bonding) of the electro-mechanical transducer 166 to the optical fiber 126, this deformation should be transferred to the optical fiber 126 causing a corresponding strain, thus modulating light traveling through the optical fiber 126. This strain in the optical fiber 126 may be interrogated at the surface 132 (e.g., FIG. 1), for example, using known multiplexing circuitry.

Figure 10:
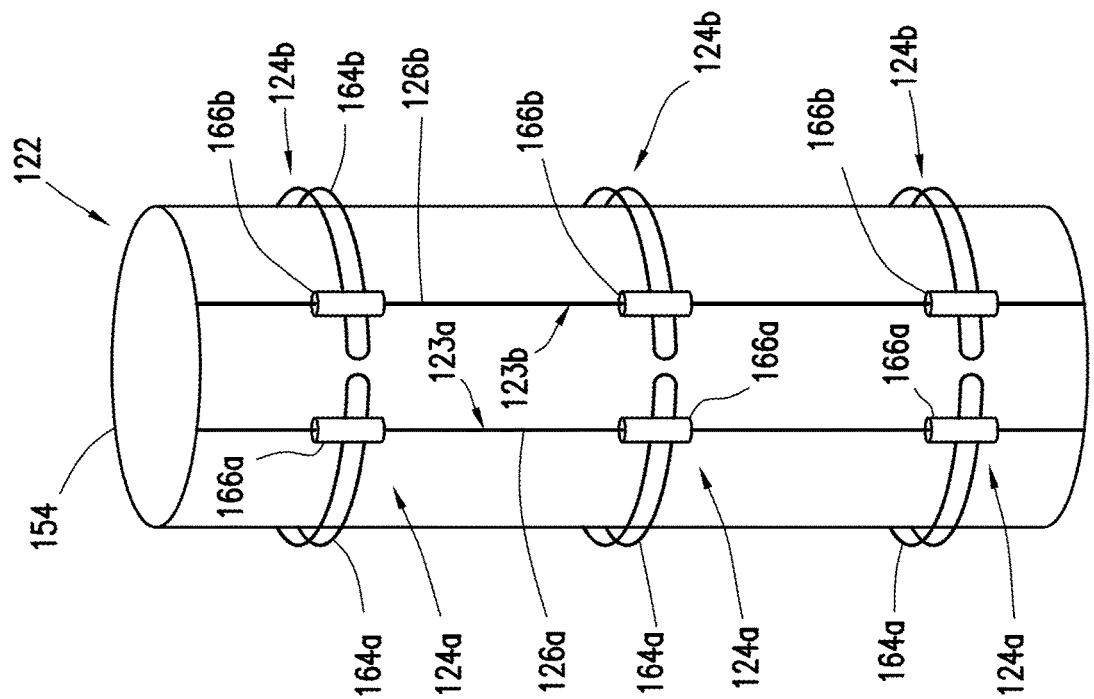
FIG. 10 is a schematic diagram of another example system for inspection of wellbore conduits using a distributed sensor system.

FIG. 10 illustrates another arrangement of a distributed sensor system 122 that may be used in the systems and methods disclosed herein. The distributed sensor system 122 shown on FIG. 10 may be used with the other components of the conduit inspection system 100 shown on FIG. 1 for monitoring one or more conduits in a wellbore 102. As illustrated, the distributed sensor system 122 may comprise a first sensor string 123a and a second sensor string 123b. By inclusion of an additional sensor string (e.g., second sensor string 123b), the arrangement of FIG. 10 may provide enhanced azimuthal sensitivity as compared to FIG. 9. The first and second sensor strings 123a, 123b may each be coupled to and extend along the conduit 154. First sensor string 123a may comprise first electromagnetic field sensors 124a disposed along the length of the optical fiber 126a. First electromagnetic field sensors 124a may each comprise first receivers 164a and first electro-mechanical transducers 166a. Second sensor string 123b may comprise second electromagnetic field sensors 124b disposed along optical fiber 126b. Second electromagnetic field sensors 124b may each comprise second receivers 164b and second electro-mechanical transducers 166b. The first and second receivers 164a and 164b may be elongated circumferential receivers as described herein with respect to FIG. 9. In contrast to the receivers 164 illustrated on FIG. 9, the first and second receivers 164a and 164b on FIG. 10 may be arranged in a loop configuration.

Figure 12:
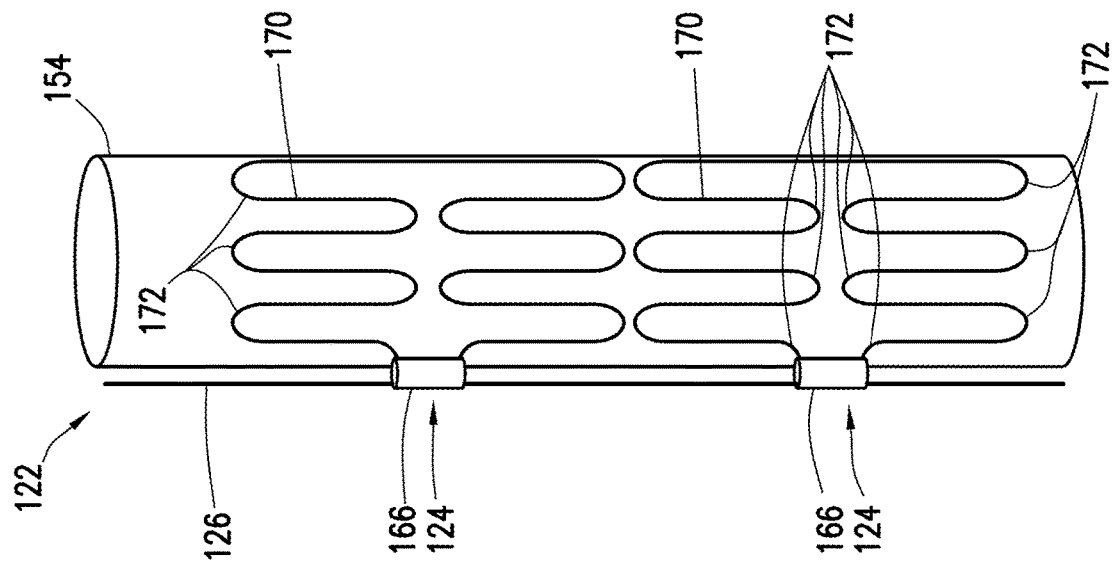
FIG. 12 is a schematic diagram of another example system for inspection of wellbore conduits using a distributed sensor system.
Figure 11:
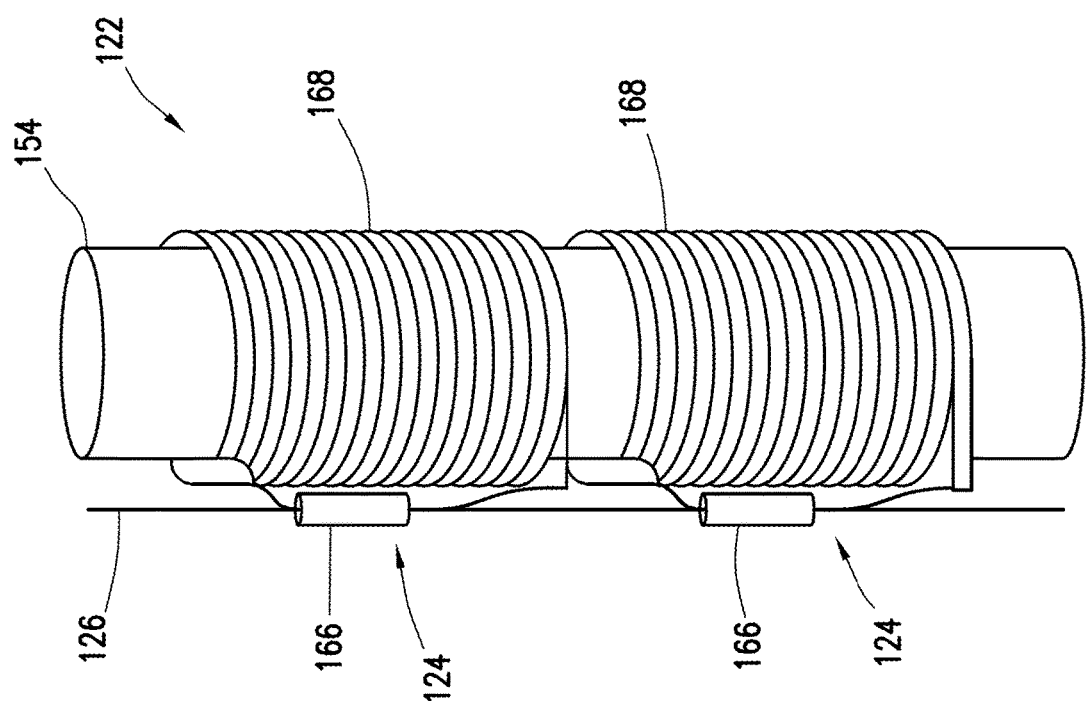
FIG. 11 is a schematic diagram of another example system for inspection of wellbore conduits using a distributed sensor system.

To further enhance azimuthal sensitivity, the receivers 164 may be in the configuration of two dimensional mesh receivers, such as solenoid receiver coils 168 illustrated on FIG. 11 or a fingered coil 170 illustrated on FIG. 12. As illustrated on FIG. 11, the solenoid receiver coils 168 may comprise multi-turn solenoid winds that wrap around the conduit 154. An example of fingered coil 170 is shown on FIG. 12 in which the fingered coil 170 includes finger sections 172 wrapped around the conduit 154. As will be appreciated by those of ordinary skill in the art, the mesh receivers may comprise a conductive material, such as metals, steel, or alloys. As illustrated, the solenoid receiver coils 168 (FIG. 11) or the fingered coil 170 (FIG. 12) may be coupled to a corresponding electro-mechanical transducer.

The systems and methods disclosed herein on FIGS. 1-12 may be used for the detection and monitoring of defects in wellbore conduits. For example, the embodiments of FIGS. 1-12 may investigate pipe electromagnetic and/or geometric properties through absolute or time-lapse measurements. In the absolute measurement case, measurements may be made by the electromagnetic field sensors 124 at a certain time and interpretation may be performed based on the measurements associated with the certain time. In the time-lapse measurement, two measurements may be made by the electromagnetic field sensors 124, one before pipe electromagnetic or geometric properties change, and one after. The amount of change in pipe electromagnetic or geometric properties should be proportional to the magnitude of the difference between the before and after signals. If the difference is above a threshold, the conduit may be considered defected. Without limitation, this threshold can be based on electromagnetic simulation of defected and non-defected conduits or statistical observations (threshold can be set such that 0.1% of time lapse signal from the well above the threshold). Without limitation, a method of interpretation which can be applied to both absolute and time-lapse signals is inversion. In inversion method, measurements from electromagnetic field sensors 124 may be compared to simulated measurements from a computer model with a certain pipe electromagnetic and geometric properties. Pipe electromagnetic and geometric properties may be adjusted until a good fit between the simulated and actual measurements are obtained. Good fit could be defined as an average of 5% or less error between the simulated and actual measurements. In certain cases, certain pipe electromagnetic and geometric parameters may be known and can be used as an input to interpretation and inversion, rather than an output. For example, in most applications, a well plan and nominal thicknesses of conduits may be available, and it can be used as an initial guess and a constraint in the inversion process. The well plan and nominal thickness of conduits may also be used to determine the threshold for detection of defects. Corrosion may result in a thickness change but may not cause change in the electromagnetic property of the remaining metal. So, interpretation or inversion may be carried out with known values of magnetic permeability and conductivity.

Accordingly, the systems and methods disclosed herein may be used in the inspection of wellbore conduits. By way of example, the systems and methods may be used to determine pipe electromagnetic and/or geometric property change of the wellbore conduits, including without limitation pipe thickness or pipe defects (e.g., corrosion). The systems and methods may be used to inspect the one or more conduits in the entire wellbore 102 or in specification zones of the wellbore 102. As will be appreciated by those of ordinary skill in the art, with the benefit of this disclosure, defects such as corrosion may be more likely to occur at/near sections of the conduits (e.g., first casing 106, second casing 108) with the production zone of the subterranean formation 104. The zones for inspection may be identified prior to deployment using, for example, openhole logs or other suitable means. More electromagnetic field sensors 124 may be deployed in the zones of interest (e.g., production zone), for example, by shortening sensor spacing, to improve vertical resolution of the inspection. Accordingly, due to the deployment in this configuration, the dense array of electromagnetic field sensors 124 in the zone of interest may also be used to detect the oil-water contact as oil is being produced from the subterranean formation 104.

To facilitate a better understanding of the present claims, the following examples of certain aspects of the disclosure are given. In no way should the following examples be read to limit, or define, the entire scope of the claims.

EXAMPLES

To demonstrate the operation of the disclosed invention, the following example model is presented. Referring now to FIG. 3, three conduits identified as first casing 106, second casing 108, and inner tubing 110 are deployed in wellbore 102. The conduits may be steel conduits having conductivity ($\sigma$)=$10^7$ siemens per meter, relative permeability ($\rho$)=100, and wall thickness=0.25 inches, with outer diameters of 5, 7, and 9⅝ inches for the inner tubing 110, first casing 106, and second casing 108, respectively. The transmitting coil 120 is a 10 centimeter coil with unit moment. The electromagnetic field sensors 124 are 10 centimeter long coils with unit moment and a sensor spacing of 10 feet. The formation and cement resistivity equals 10 Ohm-meters. The corrosion in the first casing 106 is 10% wall thinning between z=7.75 feet and z=8.25 feet wherein z=0 feet is aligned with the second electromagnetic field sensor 124. The corrosion in the second casing 108 is 10% wall thinning between z=−3.25 feet and z=−2.75 feet.

Figure 13A:
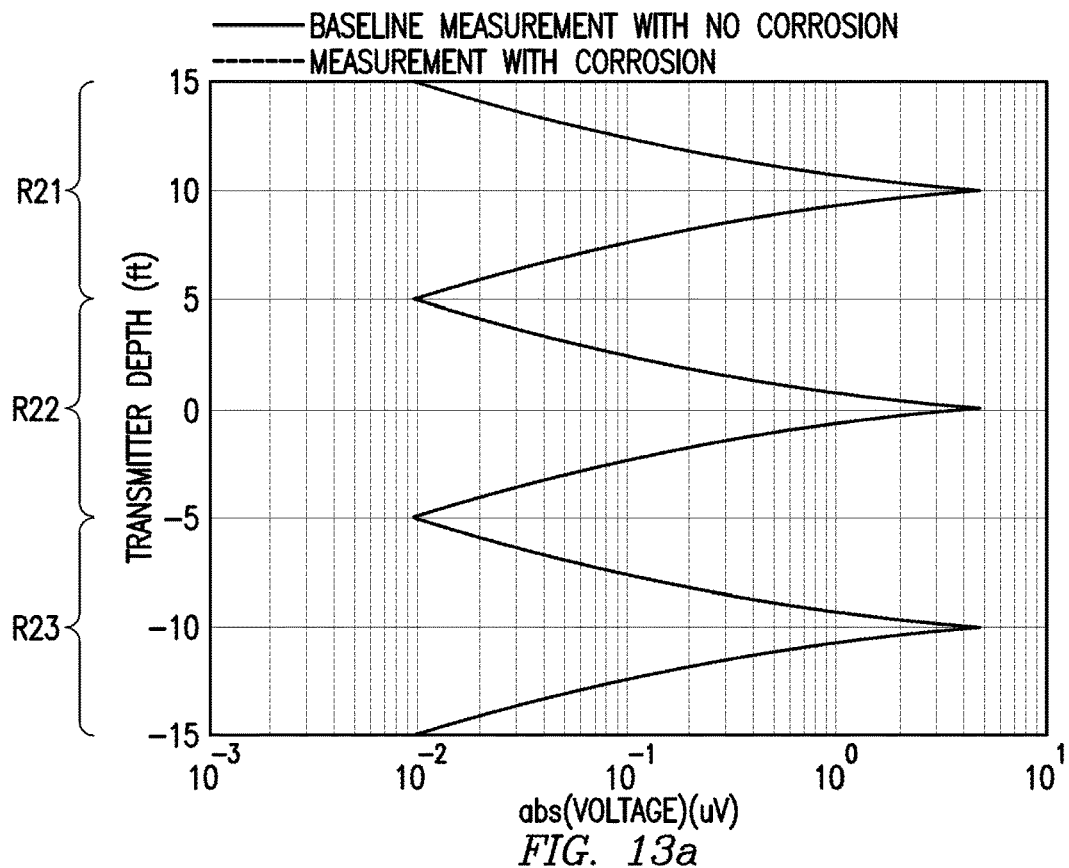
FIGS. 13*a* to 13*c* illustrate modeling results using a distributed sensor system for corrosion monitoring with a frequency of 50 Hertz, the distributed sensor system having sensors coupled to the surface casing.
Figure 13B:
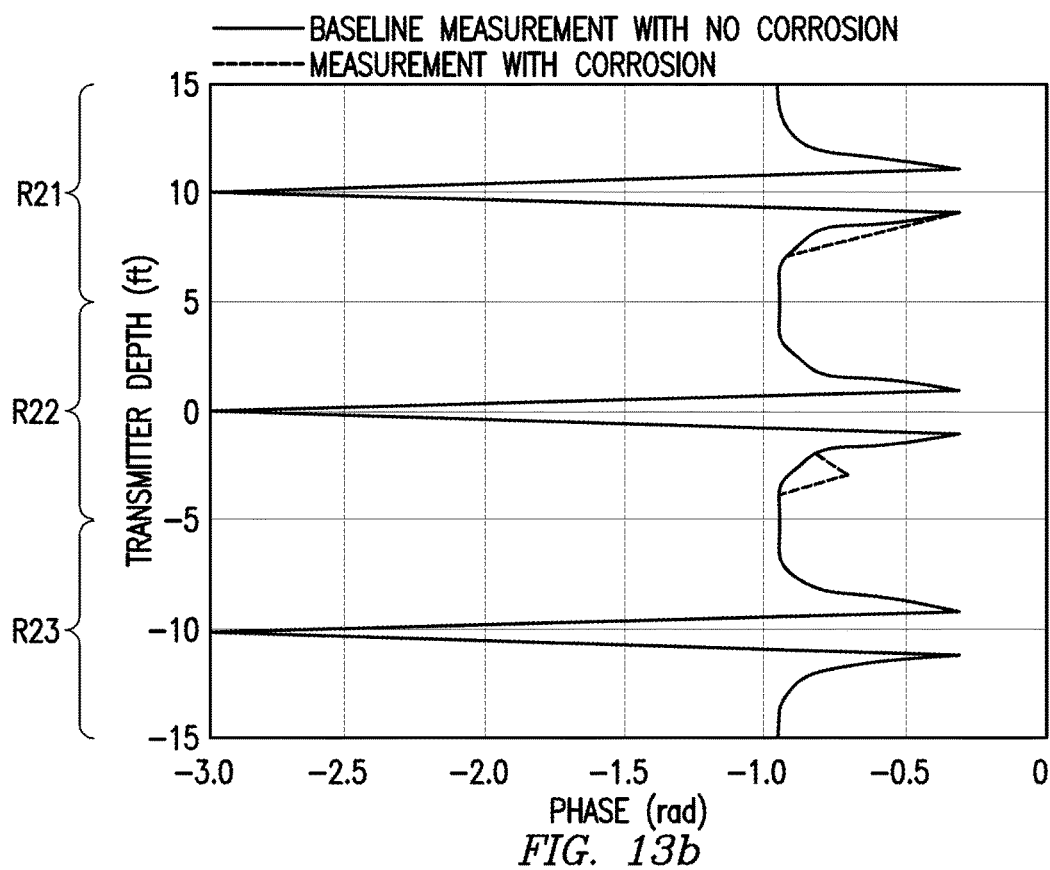
Figure 13C:
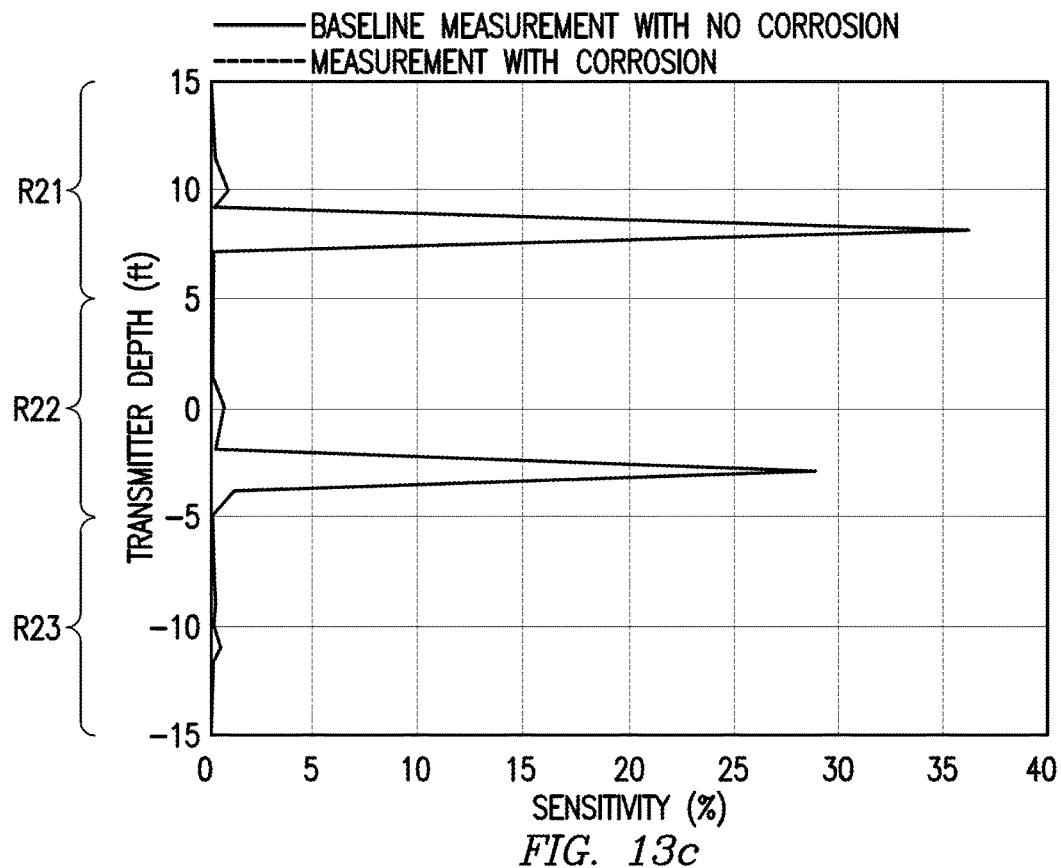
Figure 14A:
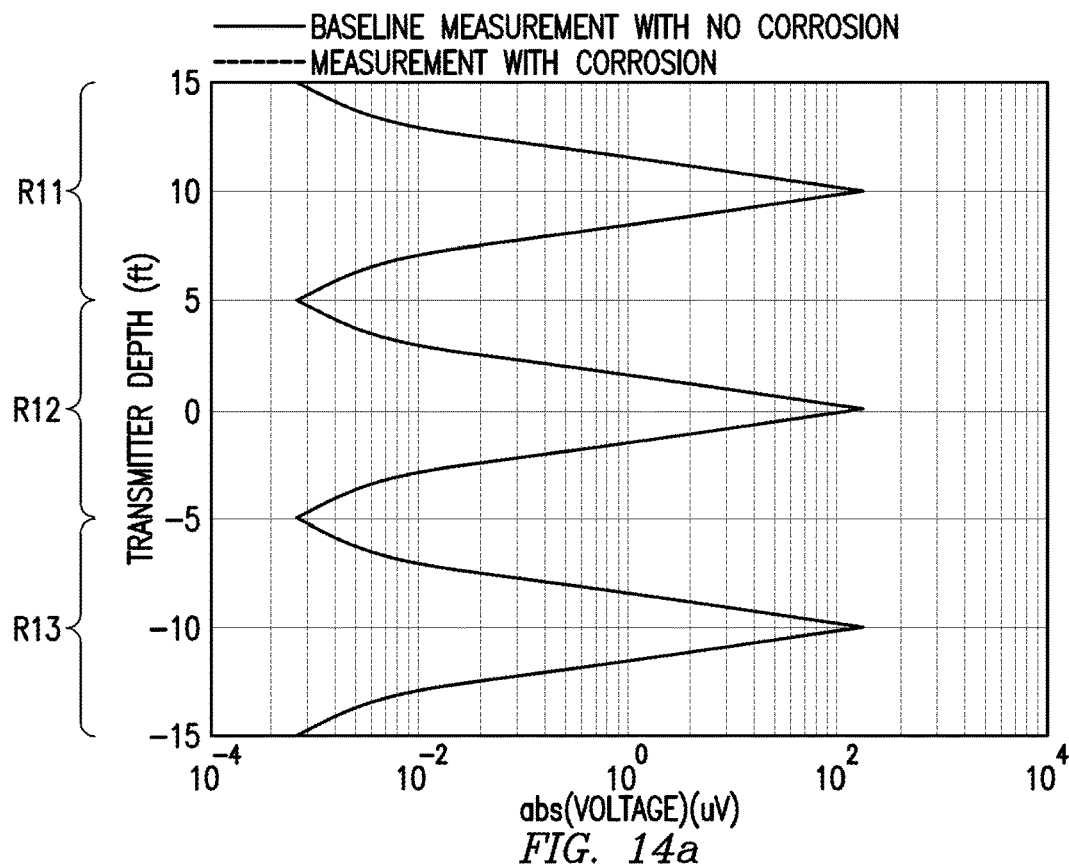
FIGS. 14*a* to 14*c* illustrate modeling results using a distributed sensor system for corrosion monitoring with a frequency of 50 Hertz, the distributed sensor system having sensors coupled to the production casing.
Figure 14B:
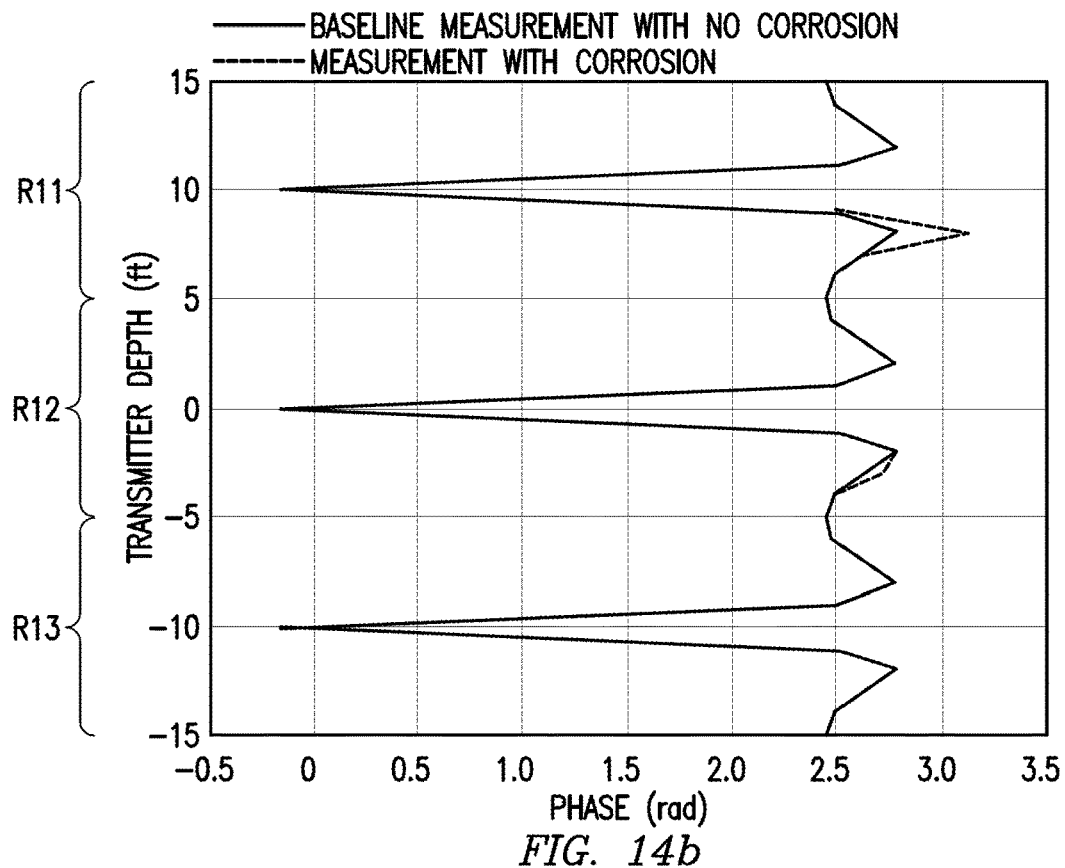
Figure 14C:
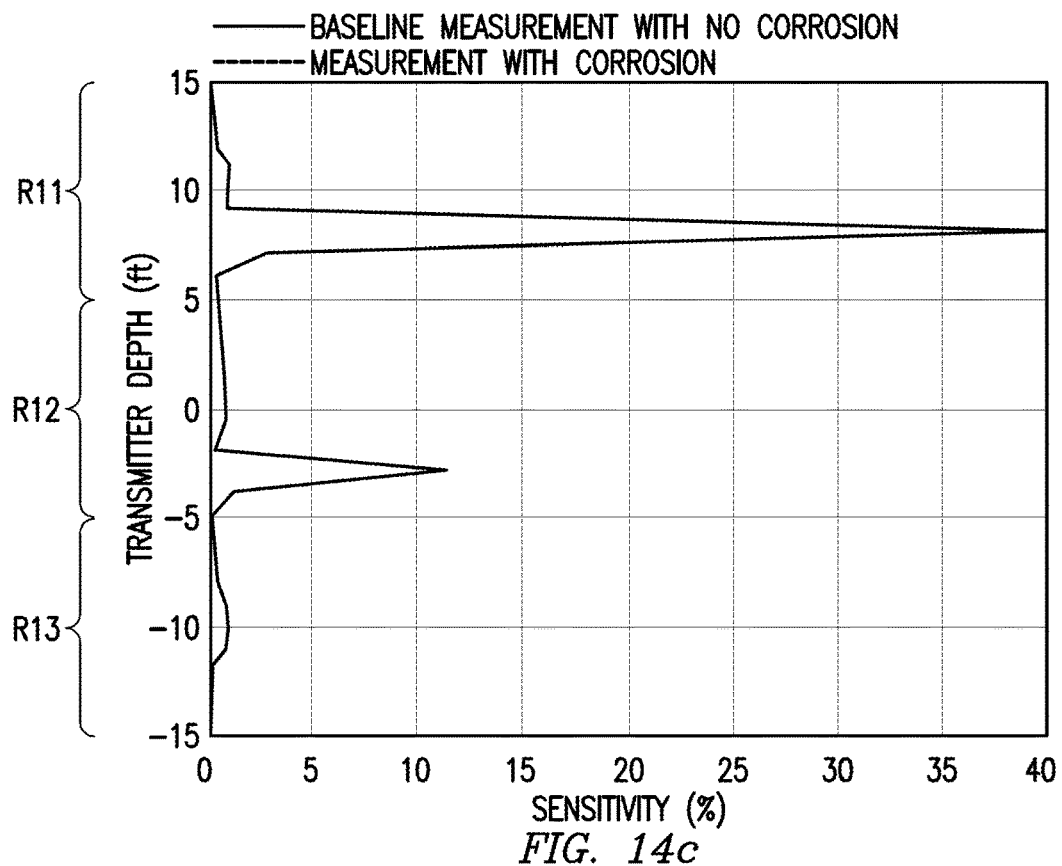
Figure 15A:
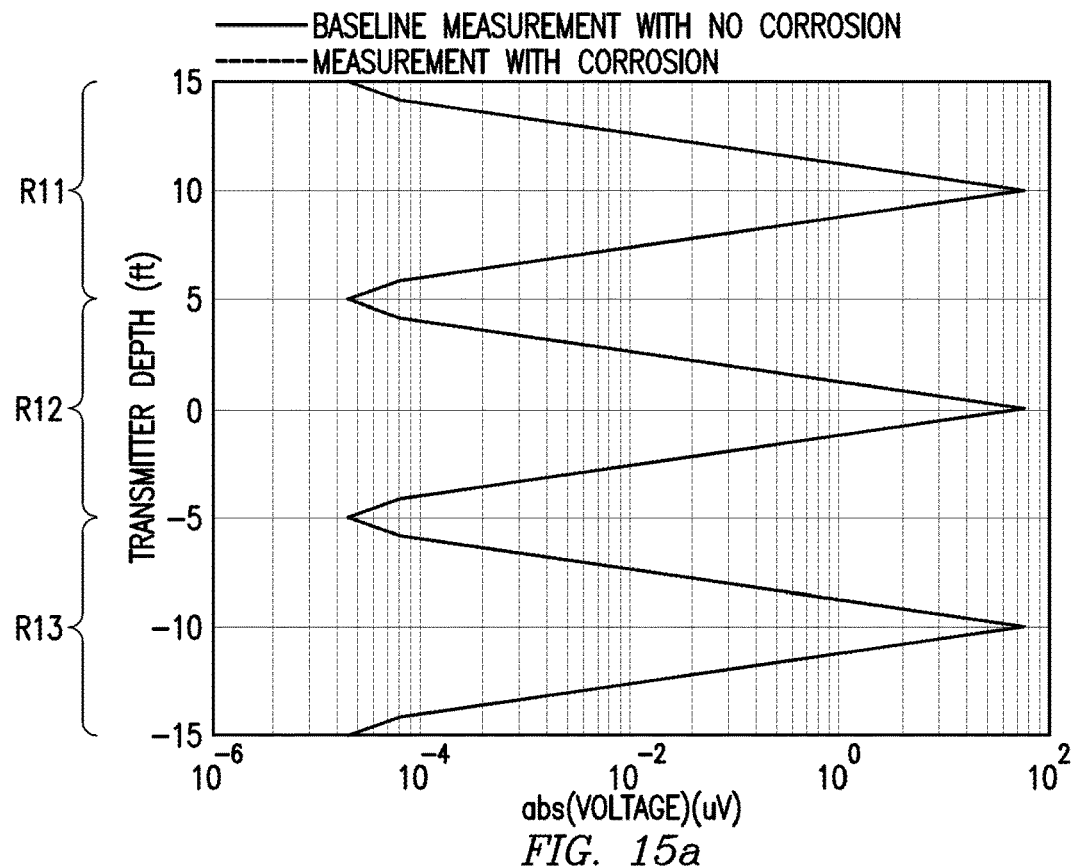
FIGS. 15*a* to 15*c* illustrate modeling results using a distributed sensor system for corrosion monitoring with a frequency of 90 Hertz, the distributed sensor system having sensors coupled to the production casing.
Figure 15B:
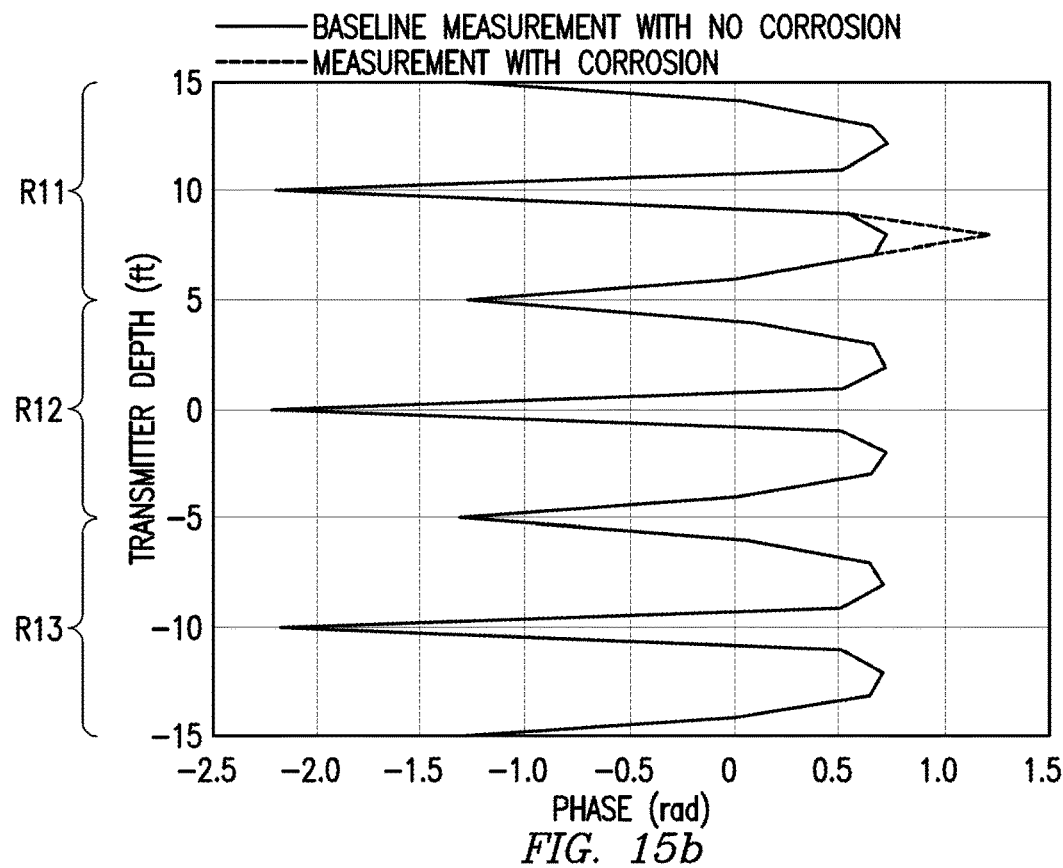
Figure 15C:
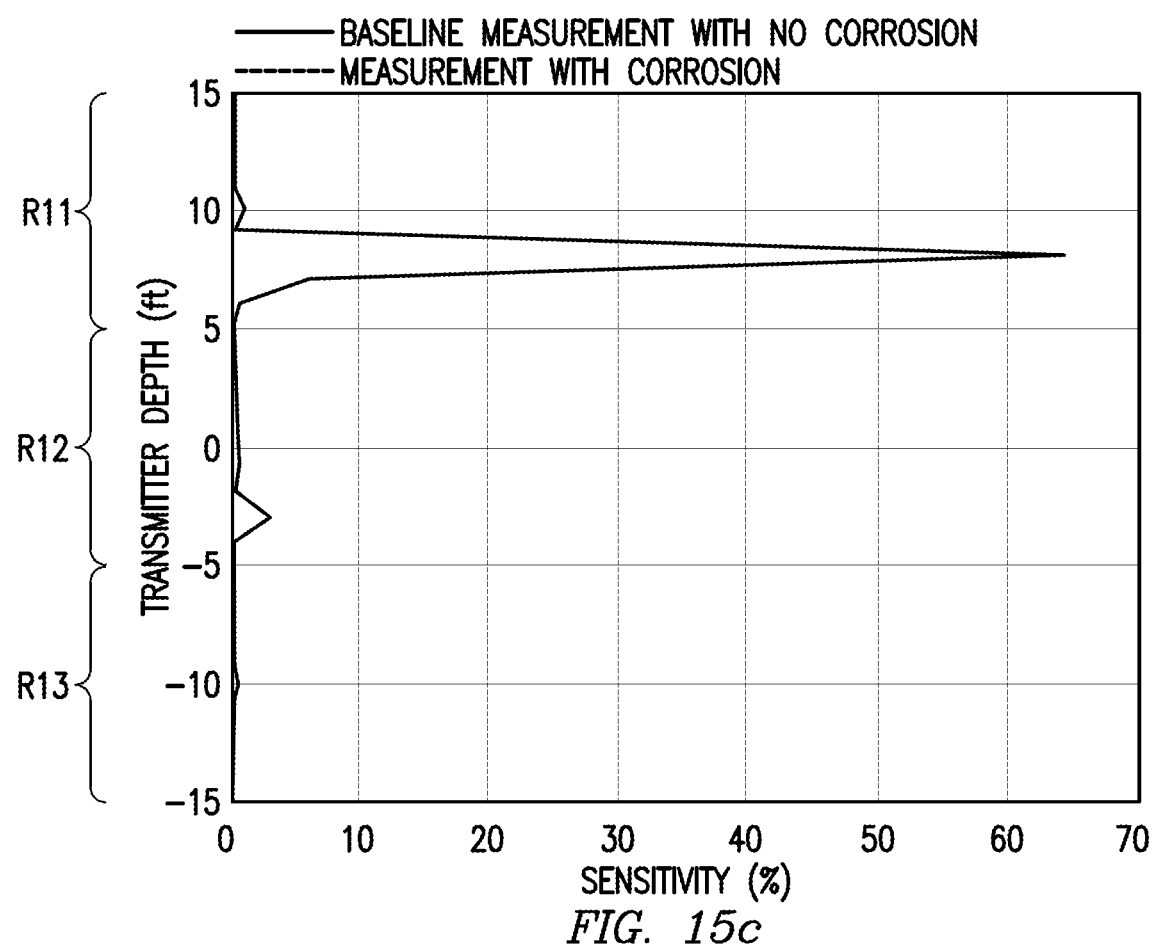

The results of the modeling are shown in FIGS. 13a to 13c, 14a to 14c, and 15a to 15c. FIGS. 13a to 13c show the results for the second casing 108 at 50 Hertz. FIGS. 14a to 14c show the results for the first casing 106 at 50 Hertz. FIGS. 15a to 15c show the results for the first casing 106 at 90 Hertz.

First, a higher frequency signal (90 Hertz) is used to monitor the first casing 106. Signals recorded using first sensor string 123a on the first casing 106 show sensitivity of more than 60% with respect to a corrosion free baseline, at the corroded pipe section, wherein sensitivity is the percentage change in signal level from a corrosion-free baseline measurement. This high frequency measurement is almost insensitive to corrosion in the second casing 108.

Next, a lower frequency signal (50 Hertz) was used. Signals recorded using sensor string 123a on the first casing 106 show sensitivity of 40% to corrosion of first casing 106 and that of 12% to corrosion of second casing 108. This measurement may be compensated using the first high frequency measurements to extract the response of the second casing 108. Alternatively, second sensor string 123b may be used to determine corrosion of the second casing 108. Signals recorded using second sensor string 123b show a higher sensitivity of 28% to corrosion of the second casing 108.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method for inspection of wellbore conduits, comprising:
   running a wireline transmitter into a wellbore, wherein the wireline transmitter only comprises:
   a body; and
   a transmitter coil coupled to the body;
   generating an electromagnetic field using the wireline transmitter, wherein the electromagnetic field penetrates one or more conduits disposed in the wellbore, and wherein the electromagnetic field induces emission of at least one secondary electromagnetic field from the one or more conduits;
   generating at least one signal in response to the secondary electromagnetic field, wherein the at least one signal is generated using a permanently installed distributed sensor system, and wherein the distributed sensor system comprises electromagnetic field sensors fastened to the one or more conduits and wherein the electromagnetic field sensors are configured to measure the at least one secondary electromagnetic field; and
   identifying a pipe electromagnetic or geometric property of the one or more conduits based on the at least one signal.

2. The method of claim 1, wherein the pipe electromagnetic or geometric property change is due to a defect or corrosion.

3. The method of claim 1, wherein the one or more conduits comprise a first casing and a second casing, wherein the first casing is disposed within the second casing.

4. The method of claim 3, wherein the method further comprises extracting measurements of the secondary electromagnetic field emitted from the second casing from the at least one signal, wherein the extracting comprising using measurements taken at a higher frequency to compensate for emissions from the first casing.

5. The method of claim 3, wherein the electromagnetic field sensors are installed along the exterior of the first casing.

6. The method of claim 3, wherein the electromagnetic field sensors comprise first electromagnetic field sensors and second electromagnetic field sensors, wherein the first electromagnetic field sensors are installed along an exterior of the first casing, and wherein the second electromagnetic sensors are installed along an exterior of the second casing.

7. The method of claim 3, wherein the electromagnetic field sensors comprise first electromagnetic field sensors and second electromagnetic field sensors, wherein the first electromagnetic field sensors are installed along an exterior of the first casing, and wherein the second electromagnetic sensors are installed along an interior of the first casing.

8. The method of claim 7, wherein the at least one signal is generated by using the difference between the readings of the first electromagnetic field sensor and the second electromagnetic field sensor.

9. The method of claim 1, wherein the distributed sensor system comprises sensor strings that extend longitudinally along a particular conduit, the sensor strings being distributed azimuthally about the particular conduit, wherein the particular conduit is one of the one or more conduits.

10. The method of claim 1, wherein the distributed sensor system comprises a sensor string that is wound about a particular conduit in a spiral arrangement, wherein the particular conduit is one of the one or more conduits.

11. The method of claim 1, wherein the distributed sensor system comprises an optical fiber and at least a portion of the electromagnetic field sensors disposed along the optical fiber, wherein the optical fiber extends along a particular conduit, wherein the electromagnetic field sensors each comprise an electro-mechanical transducer coupled to the optical fiber and an elongated circumferential receiver, wherein the particular conduit is one of the one or more conduits.

12. The method of claim 1, wherein the distributed sensor system comprises a sensor string extending along any of the one or more conduits, wherein the sensor string comprise an optical fiber and the electromagnetic field sensors disposed along the optical fiber, wherein the optical fiber extends along any of the one or more conduits, and wherein the electromagnetic field sensors each comprise an electro-mechanical transducer coupled to the optical fiber and an elongated circumferential receiver.

13. The method of claim 1, wherein the distributed sensor system comprises:
   a first sensor string that extends along a particular conduit, wherein the first sensor string comprises a first optical fiber and first electromagnetic field sensors disposed along the first optical fiber, wherein the first electromagnetic field sensors each comprise a first electromechanical transducer coupled to the first optical fiber and a first elongated circumferential receiver; and
   a second sensor string that extends along the particular conduit, wherein the second sensor string comprises a second optical fiber and second electromagnetic field sensors disposed along the second optical fiber, wherein the second electromagnetic field sensors each comprise a second electromechanical transducer coupled to the second optical fiber and a second elongated circumferential receiver;
   wherein the electromagnetic field sensors comprise the first electromagnetic field sensors and the second electromagnetic field sensors; and
   wherein the particular conduit is one of the one or more conduits.

14. The method of claim 1, wherein the electromagnetic field sensors each comprise an electro-mechanical transducer coupled to a two-dimensional mesh receiver, wherein the two-dimensional mesh receiver comprise at least one receiver selected from the group consisting of a solenoid receiver coil and a fingered coil.

15. The method of claim 1, wherein the transmitter coil comprises a solenoid coil.

16. The method of claim 1, further comprising processing absolute measurements of the at least one secondary field to identify a pipe electromagnetic or geometric property change in the one or more conduits.

17. The method of claim 1, further comprising obtaining two measurements made by the electromagnetic field sensors at different times, comparing a magnitude of a difference between the two measurements to a threshold, and identifying a defect in the one or more conduits if the magnitude exceeds the threshold.

18. The method of claim 1, further comprising comparing actual measurements made by the electromagnetic field sensors to simulated measurements; and adjusting simulated pipe electromagnetic properties and simulated geometric properties until there is 5% error or less between the actual measurements and the simulated measurements.

19. A conduit inspection system comprising:
a wireline transmitter, wherein the wireline transmitter only comprises a tool body and a transmitter coil coupled to the body, wherein the transmitter coil is configured to generate an electromagnetic field;
a distributed sensor system that is permanently installed, wherein the distributed sensor system comprises:
electromagnetic field sensors fastened to one or more conduits disposed in the wellbore, wherein electromagnetic fields sensors are configured to measure at least one secondary magnetic field induced in the one or more conduits by the electromagnetic field and generate at least one signal in response to the at least one secondary magnetic field; and
a computer system configured to determine at least one characteristic of the one or more conduits based on the at least one signal.

20. The system of claim 19, wherein the one or more conduits comprise a first casing and a second casing, wherein the first casing is disposed within the second casing.

21. The system of claim 20, wherein the electromagnetic field sensors are installed along the exterior of the first casing.

22. The system of claim 20, wherein the electromagnetic field sensors comprise first electromagnetic field sensors and second electromagnetic field sensors, wherein the first electromagnetic field sensors are installed along an exterior of the first casing, and wherein the second electromagnetic sensors are installed along an exterior of the second casing.

23. The system of claim 20, wherein the electromagnetic field sensors comprise first electromagnetic field sensors and second electromagnetic field sensors, wherein the first electromagnetic field sensors are installed along an exterior of the first casing, and wherein the second electromagnetic sensors are installed along an interior of the first casing.

24. The system of claim 19, wherein the distributed sensor system comprises sensor strings that extend longitudinally along a particular conduit, the sensor strings being distributed azimuthally about the particular conduit, wherein the particular conduit is one of the one or more conduits.

25. The system of claim 19, wherein the distributed sensor system comprises a sensor string that is wound about a particular conduit in a spiral arrangement, wherein the particular conduit is one of the one or more conduits.

26. The system of claim 19, wherein the distributed sensor system comprises an optical fiber and electromagnetic field sensors disposed along the optical fiber, wherein the optical fiber extends along a particular conduit, wherein the electromagnetic field sensors each comprise an electro-mechanical transducer coupled to the optical fiber and an elongated circumferential receiver, wherein the particular conduit is one of the one or more conduits.

27. The system of claim 19, wherein the distributed sensor system comprises a sensor string extending along any of the one or more conduits, wherein the sensor string comprise an optical fiber and at least a portion of the electromagnetic field sensors disposed along the optical fiber, wherein the optical fiber extends along any of the one or more conduits, and wherein the electromagnetic field sensors each comprise an electro-mechanical transducer coupled to the optical fiber and an elongated circumferential receiver.

28. The system of claim 19, wherein the distributed sensor system comprises:
a first sensor string that extends along a particular conduit, wherein the first sensor string comprises a first optical fiber and first electromagnetic field sensors disposed along the first optical fiber, wherein the first electromagnetic field sensors each comprise a first electromechanical transducer coupled to the first optical fiber and a first elongated circumferential receiver; and
a second sensor string that extends along the particular conduit, wherein the second sensor string comprises a second optical fiber and second electromagnetic field sensors disposed along the second optical fiber, wherein the second electromagnetic field sensors each comprise a second electromechanical transducer coupled to the second optical fiber and a second elongated circumferential receiver;
wherein the electromagnetic field sensors comprise the first electromagnetic field sensors and the second electromagnetic field sensors; and
wherein the particular conduit is one of the one or more conduits.

29. The system of claim 19, wherein the electromagnetic field sensors each comprise an electro-mechanical transducer coupled to a two-dimensional mesh receiver, wherein the two-dimensional mesh receiver comprise at least one receiver selected from the group consisting of a solenoid receiver coil and a fingered coil.

30. The system of claim 19, wherein the transmitter coil comprises a solenoid coil.

* * * * *